United States Patent
Iwayama

(10) Patent No.: US 10,049,264 B2
(45) Date of Patent: Aug. 14, 2018

(54) OVERHEAD IMAGE-READING APPARATUS, IMAGE-PROCESSING METHOD, AND COMPUTER PROGRAM PRODUCT

(71) Applicant: PFU LIMITED, Ishikawa (JP)

(72) Inventor: Akira Iwayama, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 98 days.

(21) Appl. No.: 15/098,161

(22) Filed: Apr. 13, 2016

(65) Prior Publication Data

US 2016/0232405 A1    Aug. 11, 2016

Related U.S. Application Data

(63) Continuation of application No. PCT/JP2013/082994, filed on Dec. 9, 2013.

(51) Int. Cl.
| | | |
|---|---|---|
| G06K 9/00 | (2006.01) |
| H04N 1/00 | (2006.01) |
| H04N 1/10 | (2006.01) |
| H04N 1/107 | (2006.01) |
| H04N 5/222 | (2006.01) |

(Continued)

(52) U.S. Cl.
CPC ......... *G06K 9/00355* (2013.01); *G06K 9/209* (2013.01); *G06K 9/2081* (2013.01); *G06K 9/4604* (2013.01); *G06T 3/0031* (2013.01); *H04N 1/00* (2013.01); *H04N 1/00827* (2013.01); *H04N 1/10* (2013.01); *H04N 1/107* (2013.01); *H04N 1/1078* (2013.01); *H04N 5/222* (2013.01); *H04N 5/144* (2013.01); *H04N 2201/0434* (2013.01)

(58) Field of Classification Search
CPC combination set(s) only.
See application file for complete search history.

(56) References Cited

U.S. PATENT DOCUMENTS 5,377,019 A * 12/1994 Okisu ............... H04N 1/00795
358/448
5,742,279 A * 4/1998 Yamamoto ............ G06F 3/033
345/173

(Continued)

FOREIGN PATENT DOCUMENTS

| JP | 11-103380 A | 4/1999 |
| JP | 2000-308045 A | 11/2000 |

(Continued)

OTHER PUBLICATIONS

International Search Report issued in corresponding Application No. PCT/JP2013/082994, dated Jan. 14, 2014.

*Primary Examiner* — Tsung-Yin Tsai
(74) *Attorney, Agent, or Firm* — McDermott Will & Emery LLP

(57) ABSTRACT

According to the present disclosure, a page-turned bound medium is read continuously to acquire images, it is determined whether there is any image without the appearance of a foreign object out of the images corresponding to the same page, when it is determined that there is any image without the appearance of the foreign object, the image without the appearance of the foreign object is acquired as an output image, and when it is determined that there is not any image without the appearance of the foreign object, the images corresponding to the same page are combined to acquire the output image.

17 Claims, 18 Drawing Sheets

(51) Int. Cl.
*G06T 3/00* (2006.01)
*G06K 9/20* (2006.01)
*G06K 9/46* (2006.01)
*H04N 5/14* (2006.01)

(56) References Cited

U.S. PATENT DOCUMENTS

| | | | | |
|---|---|---|---|---|
| 5,969,795 | A * | 10/1999 | Honda | H04N 1/387 355/25 |
| 6,233,363 | B1 * | 5/2001 | Iida | H04N 1/38 358/461 |
| 6,396,960 | B1 * | 5/2002 | Yoshimura | H04N 1/00795 358/450 |
| 6,697,536 | B1 * | 2/2004 | Yamada | G06K 9/00335 358/461 |
| 6,947,609 | B2 * | 9/2005 | Seeger | G06K 9/00993 358/486 |
| 7,423,671 | B2 * | 9/2008 | Kiso | H04N 1/387 348/218.1 |
| 7,710,551 | B2 * | 5/2010 | Hersch | G07D 7/207 356/71 |
| 9,202,260 | B2 * | 12/2015 | He | G06T 5/001 |
| 9,258,448 | B2 * | 2/2016 | Sakai | H04N 1/047 |
| 9,300,831 | B2 * | 3/2016 | Murai | H04N 1/04 |
| 9,665,168 | B2 * | 5/2017 | Oshima | H04N 13/0459 |
| 2011/0299136 | A1 * | 12/2011 | Kubo | G06K 9/3208 358/474 |
| 2015/0317784 | A1 * | 11/2015 | Oshima | H04N 13/0459 348/54 |

FOREIGN PATENT DOCUMENTS

| | | |
|---|---|---|
| JP | 2000-354152 A | 12/2000 |
| JP | 2010-056771 A | 3/2010 |
| JP | 2011-254366 A | 12/2011 |

* cited by examiner

TRACK MOVEMENT OF FEATURE
POINTS BETWEEN FRAMES
[Lucas-Kanade method]

EXTRACT ONLY HORIZONTAL
VECTORS
[Motion vector filter]

DETERMINE PAGE MOTION FROM
DIRECTIONS OF MOVEMENT VECTORS

PAGE MOVING DIRECTION

FIG.12

RIGHT IMAGE LIST

| IMAGE NUMBER | PRESENCE OR ABSENCE OF TURNING | PRESENCE OR ABSENCE OF PAGE MOTION | NUMBER OF HAND | FIRST | | | | | SECOND | | |
|---|---|---|---|---|---|---|---|---|---|---|---|
| | | | | HAND COORDINATES | | SIZE | HAND SHAPE | | HAND COORDINATES | SIZE | HAND SHAPE |
| | | | | X | Y | | | | X | Y | | |
| 1 | 0 | 0 | 0 | | | | | | | | |
| 2 | 0 | 0 | 0 | | | | | | | | |
| 3 | 0 | 0 | 1 | 600 | 400 | 100 | hand_R1_003.tif | | | | |
| 4 | 0 | 1 | 1 | 590 | 410 | 90 | hand_R1_004.tif | | | | |
| 5 | 1 | 1 | 1 | 500 | 380 | 88 | hand_R1_005.tif | | | | |
| 6 | 1 | 1 | 1 | 400 | 390 | 60 | hand_R1_006.tif | | | | |
| 7 | 0 | 1 | 0 | | | | | | | | |
| 8 | 0 | 0 | 0 | | | | | | | | |
| 9 | 0 | 0 | 0 | | | | | | | | |
| 10 | 0 | 0 | 0 | | | | | | | | |
| 11 | 0 | 0 | 1 | 340 | 360 | 30 | hand_R1_011.tif | | | | |
| 12 | 0 | 1 | 1 | 590 | 390 | 95 | hand_R1_012.tif | | | | |
| 13 | 1 | 1 | 1 | 600 | 400 | 95 | hand_R1_013.tif | | | | |
| 14 | 1 | 1 | 1 | 530 | 370 | 70 | hand_R1_014.tif | | | | |
| 15 | 0 | 1 | 0 | | | | | | | | |
| 16 | 0 | 0 | 0 | | | | | | | | |

FIG.13

LEFT IMAGE LIST

| IMAGE NUMBER | PRESENCE OR ABSENCE OF TURNING | PRESENCE OR ABSENCE OF PAGE MOTION | NUMBER OF HAND | FIRST (LEFT HAND) | | | | SECOND | | | |
|---|---|---|---|---|---|---|---|---|---|---|---|
| | | | | HAND COORDINATES | | SIZE | HAND SHAPE | HAND COORDINATES | | SIZE | HAND SHAPE |
| | | | | X | Y | | | X | Y | | |
| 1 | 0 | 0 | 0 | | | | | | | | |
| 2 | 0 | 0 | 0 | | | | | | | | |
| 3 | 0 | 0 | 1 | 50 | 460 | 30 | hand_L1_003.tif | | | | |
| 4 | 0 | 0 | 1 | 100 | 400 | 80 | hand_L1_004.tif | | | | |
| 5 | 0 | 0 | 1 | 100 | 400 | 100 | hand_L1_005.tif | | | | |
| 6 | 0 | 1 | 1 | 100 | 395 | 100 | hand_L1_006.tif | | | | |
| 7 | 1 | 1 | 2 | 100 | 390 | 100 | hand_L1_007.tif | 300 | 390 | 80 | hand_L2_007.tif |
| 8 | 1 | 1 | 2 | 100 | 390 | 100 | hand_L1_008.tif | 210 | 400 | 100 | hand_L2_008.tif |
| 9 | 0 | 1 | 2 | 50 | 400 | 100 | hand_L1_009.tif | 200 | 400 | 100 | hand_L2_009.tif |
| 10 | 0 | 0 | 2 | 50 | 400 | 80 | hand_L1_010.tif | 300 | 390 | 80 | hand_L2_010.tif |
| 11 | 0 | 0 | 1 | 100 | 400 | 90 | hand_L1_011.tif | | | | |
| 12 | 0 | 1 | 1 | 100 | 400 | 100 | hand_L1_012.tif | | | | |
| 13 | 0 | 1 | 1 | 100 | 400 | 100 | hand_L1_013.tif | | | | |
| 14 | 0 | 1 | 1 | 100 | 400 | 100 | hand_L1_014.tif | | | | |
| 15 | 1 | 1 | 2 | 100 | 400 | 100 | hand_L1_015.tif | 300 | 380 | 30 | hand_L2_015.tif |
| 16 | 1 | 1 | 2 | 80 | 400 | 100 | hand_L1_016.tif | 220 | 400 | 90 | hand_L2_016.tif |

# OVERHEAD IMAGE-READING APPARATUS, IMAGE-PROCESSING METHOD, AND COMPUTER PROGRAM PRODUCT

CROSS-REFERENCE TO RELATED APPLICATION

This application is based upon and claims the benefit of priority from the international application under the Patent Cooperation Treaty No. PCT/JP2013/082994, filed on Dec. 9, 2013, the entire contents of which are incorporated herein by reference.

BACKGROUND OF THE INVENTION

1. Field of the Invention

The present disclosure relates to an overhead image-reading apparatus, an image-processing method, and a computer program product.

2. Description of the Related Art

Techniques for an overhead scanner have been conventionally disclosed.

Specifically, an overhead scanner apparatus that includes an area sensor and a linear sensor configured to extract a velocity vector and determine the start of the linear sensor's reading has been disclosed (refer to JP-A-2011-254366).

In addition, an image-reading apparatus that determines page turning from manual text actions and erases fingers and their shades from a read image without erasing the contents hidden behind the shadow of the fingers has been disclosed (refer to JP-A-11-103380).

Further, a document picture acquiring device that inputs images at regular time intervals, detects the region of a hand seen in the images based on the hand's motion characteristics from the image displayed when the input image is still, and cuts out and acquire the text images (refer to JP-A-2000-308045).

However, the conventional overhead scanners (disclosed in JP-A-2011-254366 and the like) have the problem that it is not possible to determine which frame is effective when image reading is continuously performed.

SUMMARY OF THE INVENTION

It is an object of the present disclosure to at least partially solve the problems in the conventional technology.

An overhead image-reading apparatus according to one aspect of the present disclosure includes an image acquiring unit that causes an image-reading unit to read continuously a page-turned bound medium to acquire images, a detection determining unit that determines whether there is any image without the appearance of a foreign object out of the images corresponding to the same page, and an output image acquiring unit that, when the detection determining unit determines that there is any image without the appearance of the foreign object, acquires the image without the appearance of the foreign object as an output image, and when the detection determining unit determines that there is not any image without the appearance of the foreign object, combines the images corresponding to the same page to acquire the output image.

An image-processing method according to another aspect of the present disclosure executed by an overhead image-reading apparatus includes an image acquiring step of causing an image-reading unit to read continuously a page-turned bound medium to acquire images, a detection determining step of determining whether there is any image without the appearance of a foreign object out of the images corresponding to the same page, and an output image acquiring step of acquiring, when at the detection determining step, it is determined that there is any image without the appearance of the foreign object, the image without the appearance of the foreign object as an output image, and combining, when at the detection determining step, it is determined that there is not any image without the appearance of the foreign object, the images corresponding to the same page to acquire the output image.

A computer program product according to still another aspect of the present disclosure is a computer program product having a non-transitory tangible computer readable medium including programmed instructions for causing, when executed by an overhead image-reading apparatus, the overhead image-reading apparatus to perform an image-processing method including an image acquiring step of causing an image-reading unit to read continuously a page-turned bound medium to acquire images, a detection determining step of determining whether there is any image without the appearance of a foreign object out of the images corresponding to the same page, and an output image acquiring step of acquiring, when at the detection determining step, it is determined that there is any image without the appearance of the foreign object, the image without the appearance of the foreign object as an output image, and combining, when at the detection determining step, it is determined that there is not any image without the appearance of the foreign object, the images corresponding to the same page to acquire the output image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a diagram of an example of a list according to the embodiment;

FIG. 13 is a diagram of an example of a list according to the embodiment;

DETAILED DESCRIPTION OF THE PREFERRED EMBODIMENTS

Embodiments of an overhead image-reading apparatus, an image-processing method, and a computer program product according to the present disclosure will be explained below in detail with reference to drawings. The present disclosure is not limited to these embodiments. In particular, in the following descriptions of this embodiment, a bound medium to be read will be explained as a book or the like. However, the bound medium to be read is not limited to this but may be a stapled medium or the like.

1. Overview of the Embodiment of the Present Disclosure

Figure 1:
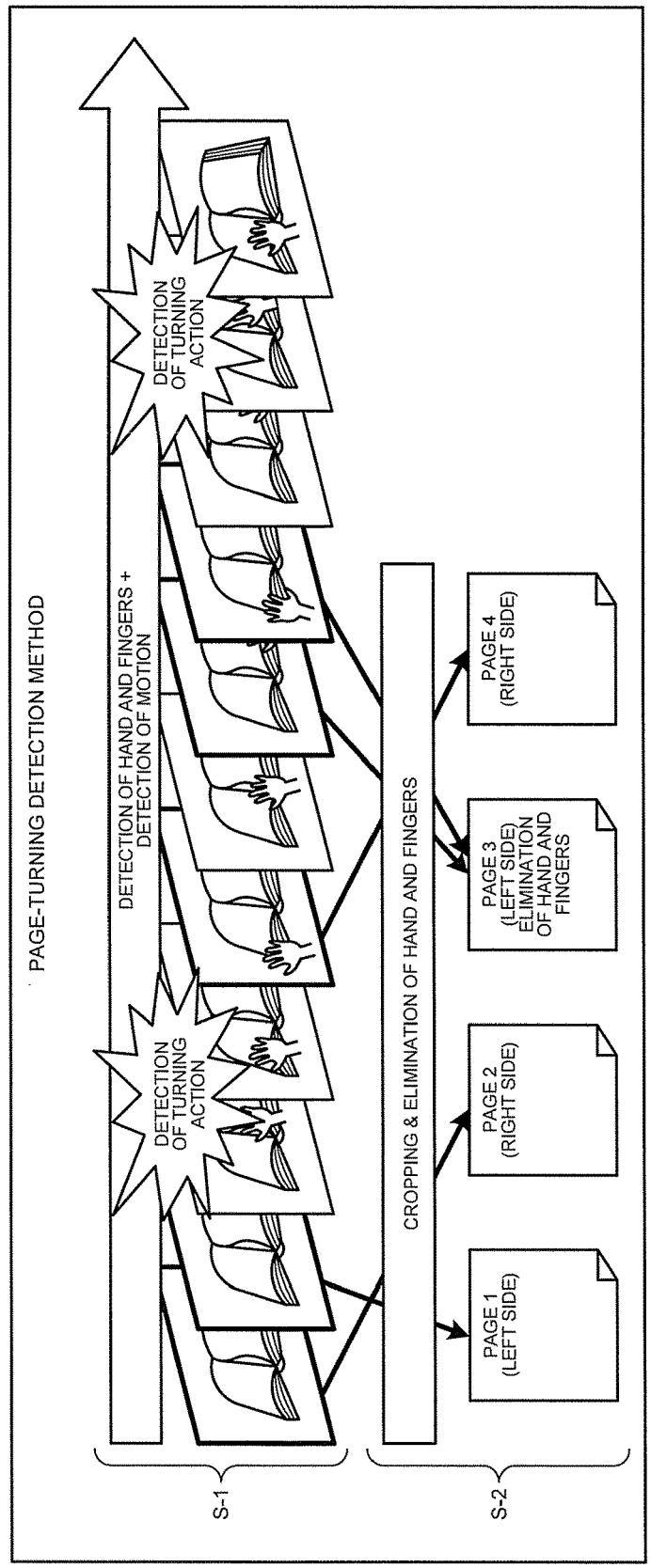
FIG. 1 is a diagram of an overview of an embodiment.

The overview of the embodiment of the present disclosure will be explained with reference to FIG. 1, and then configurations, processes, and the like of the embodiment will be explained in detail. FIG. 1 is a diagram of the overview of the embodiment. The embodiment has generally basic features explained below.

Specifically, the overhead image-reading apparatus according to the embodiment causes an image-reading unit to read continuously a bound medium turned by the user and acquire images as shown in FIG. 1.

The overhead image-reading apparatus performs page turning detection by motion detection (turning action detection), and detects any foreign object included in the images (fingers, a spin (tassel), or the like) to determine whether there are any images without the appearance of a hand and fingers out of images corresponding to the same page (step S-1).

When determining that there are any images without the appearance of a foreign object, the overhead image-reading apparatus acquires the images without the appearance of a foreign object as output images, such as page 1, 2, and 4. When determining that there is no image without the appearance of a foreign object such as page 3, the overhead image-reading apparatus removes the foreign object by image cropping and acquires the output images by combining the images corresponding to the same page (step S-2), and then the processing is ended.

2. Configuration of the Embodiment

Figure 2:
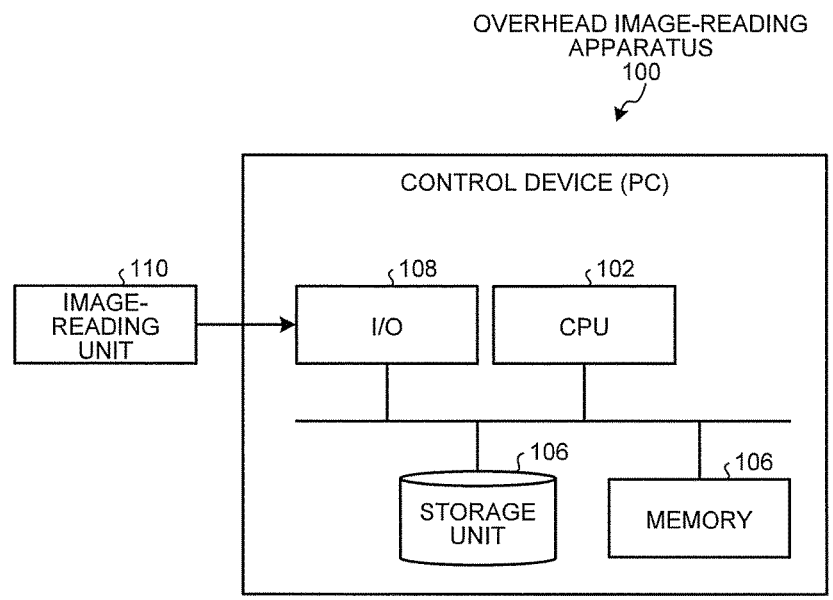
FIG. 2 is a hardware configuration diagram of a schematic configuration example of an overhead image-reading apparatus.
Figure 3:
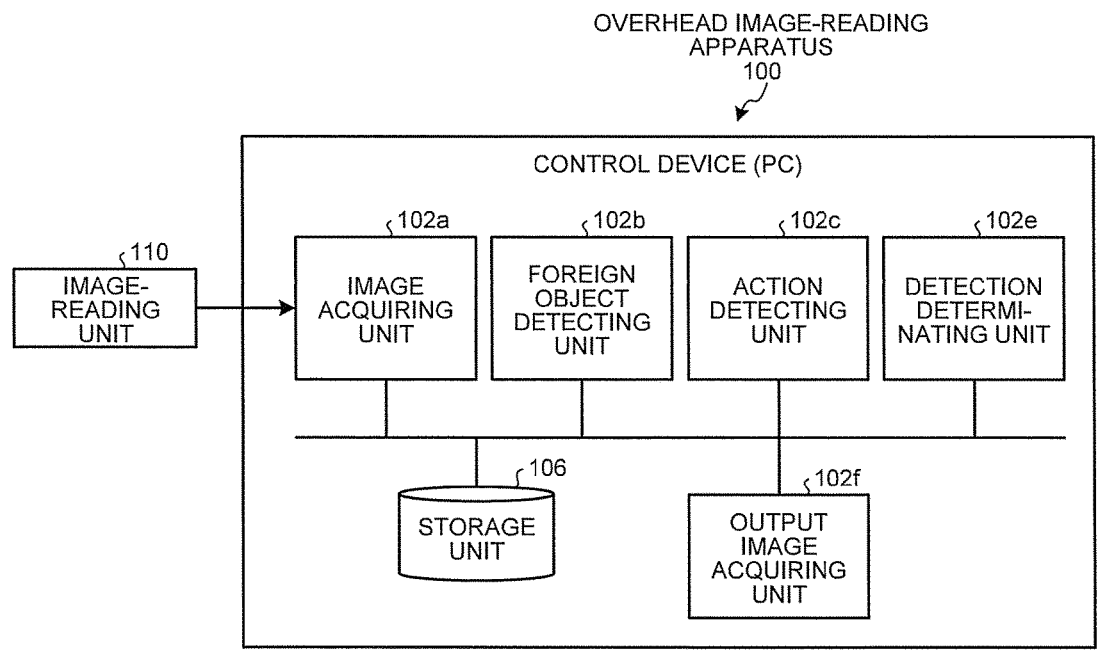
FIG. 3 is a hardware configuration diagram of a configuration example of the overhead image-reading apparatus.
Figure 4:
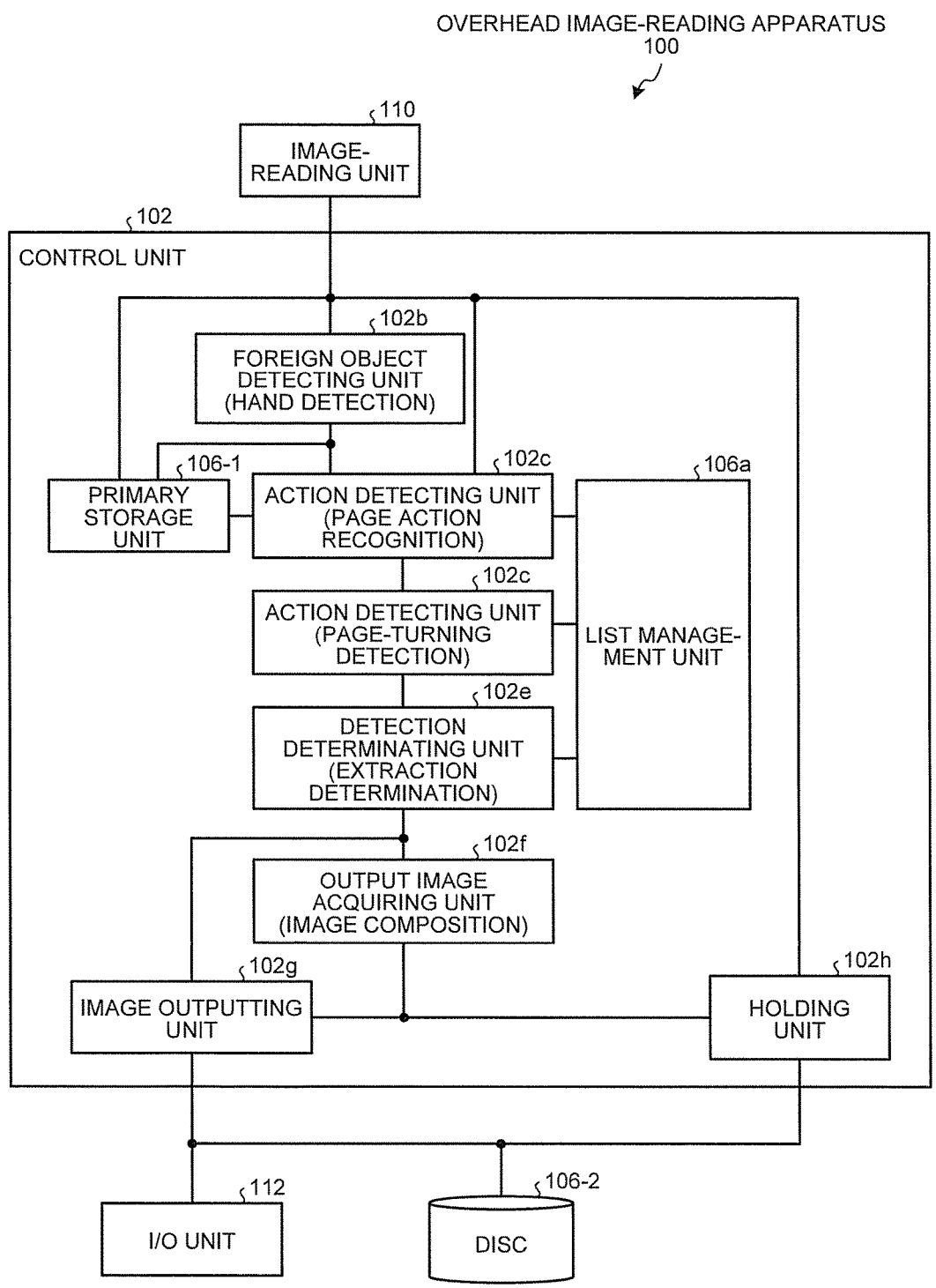
FIG. 4 is a hardware configuration diagram of a configuration example of the overhead image-reading apparatus.

A configuration example of an overhead image-reading apparatus 100 according to the embodiment will be explained with reference to FIGS. 2 to 4. FIG. 2 is a hardware configuration diagram of a schematic configuration example of the overhead image-reading apparatus 100. FIG. 3 is a hardware configuration diagram of a configuration example of the overhead image-reading apparatus 100. FIG. 4 is a hardware configuration diagram of a configuration example of the overhead image-reading apparatus 100.

As shown in FIG. 2, the overhead image-reading apparatus 100 includes generally an image-reading unit 110 such as a camera and a control device (PC). The control device (PC) includes at least a control unit (controller or control circuitry such as CPU) 102, and in the embodiment, the control device (PC) further includes a storage unit 106 containing a memory or the like, and an input/output interface unit (I/O) 108. These units are communicably connected via an arbitrary communication path.

As shown in FIG. 3, the overhead image-reading apparatus 100 includes the image-reading unit 110 and the control device (PC). The control device (PC) includes at least an image acquiring unit 102a, a foreign object detecting unit 102b that conducts hand detection and the like, an action detecting unit 102c that conducts turning detection and the like, a detection determining unit 102e that conducts scene detection and the like, an output image acquiring unit 102f that conducts image composition and the like, and the storage unit 106. These units are communicably connected via an arbitrary communication path.

As shown in FIG. 4, the overhead image-reading apparatus 100 includes at least the image-reading unit 110, the control unit 102, a disc 106-2, and an input/output unit (I/O unit) 112. The control unit 102 includes at least the foreign object detecting unit 102b that conducts hand detection and the like, the action detecting unit 102c that conducts page-turning action recognition and page-turning detection and the like, the detection determining unit 102e that conducts extraction detection and the like, the output image acquiring unit 102f that conducts image composition and the like, an image outputting unit 102g, a holding unit 102h, a list management unit 106a, and a primary storage unit 106-1. These units are communicably connected via an arbitrary communication path.

The overhead image-reading apparatus 100 of the embodiment may further include a loading stand for a bound medium. The image-reading unit 110 may be disposed on the top of the loading stand to photograph the loading stand. The control unit 102 may control the image-reading unit 110.

The storage unit 106 (the primary storage unit 106-1, the disc 106-2, and the like) stores any one, some, or all of various databases, tables, and files (the list management unit 106a). The storage unit 106 is a storage unit that may be any one, some, or all of a memory such as a RAM or a ROM, a fixed disc device such as a hard disc, a flexible disc, and an optical disc, for example. The storage unit 106 stores computer programs and the like for providing orders to a central processing unit (CPU) to perform various processes. FIG. 2 is a block diagram illustrating an example of a logical configuration of the storage unit 106 in the overhead image-reading apparatus 100.

Among the foregoing constituent elements of the storage unit 106, the list management unit 106a stores a list of image numbers, information on the appearance of foreign objects, and information on a page turning action, in association with one another. The image numbers may be given in the order the images were read by the image-reading unit 110 or the like. The foreign objects may be any one, some, or all of the user's hand (fingers), a spin (tassel), a pen, a ruler, and an arm of an automatic page-tuner, or may be any one, some, or all of a shade, an image (portion) corresponding to another page, and image noise. The information on the appearance of foreign objects may include any one, some, or all of the number of foreign objects, their coordinates, their sizes, and their shapes. The information on page-turning action may include information indicative of any one or both of the presence or absence of turning and the presence or absence of page motion.

The input/output interface unit 108 connects the image-reading unit 110 to the control unit 102.

The image-reading unit (imager or image reader) 110 scans from overhead a document such as a bound medium placed upward to read an image from the document. The image-reading unit 110 may scan from overhead the document placed upward by the use of a linear sensor to read the image from the document. In the embodiment, the image-reading unit 110 may include a controller, a motor, a linear sensor (line sensor), and an A/D converter. The controller controls the motor, the linear sensor, and the A/D converter according to instructions from the control unit 102 via the input/output interface unit 108. The linear sensor converts photo-electrically light delivered from lines of the document in a main scanning direction to analog charge for each pixel in the lines. The A/D converter converts the analog charge output from the linear sensor to a digital signal, and outputs a one-dimensional image (line image). When the motor is rotationally driven, the document lines to be read by the linear sensor are moved in a sub scanning direction. Accordingly, the A/D converter outputs one-dimensional images for the individual lines, and the control unit 102 composites these images to generate a two-dimensional image.

When the document is placed upward and the image-reading unit 110 photographs the document from overhead, the linear sensor may read the one-dimensional images from the lines in the main scanning direction. Then, when the linear sensor is rotated by the driving of the motor in a predetermined rotational direction, the lines read by the linear sensor move in a predetermined sub scanning direction (for example, from the back to front sides along the depth). Accordingly, the image-reading unit 110 reads the two-dimensional document image.

The image-reading unit 110 may scan from overhead the document placed upward by the use of an area sensor to read the image from the document. In the embodiment, the image-reading unit 110 may include a controller, an area sensor, and an A/D converter. The controller controls the area sensor and the A/D converter according to instructions from the control unit 102 via the input/output interface unit 108. The area sensor converts photo-electrically light delivered from a document plane (a two-dimensional plane in the main scanning direction and the sub scanning direction) to analog charge for the individual pixels. The A/D converter converts the analog charge output from the area sensor to a digital signal and outputs a two-dimensional image. Accordingly, the A/D converter outputs the two-dimensional image. The image-reading unit 110 may be a camera or the like.

The input/output unit 112 performs data input and output (I/O). The input/output unit 112 may be a key input unit, a touch panel, a control pad (for example, a touch pad, a game pad, or the like), a mouse, a keyboard, a microphone, or the like, for example. The input/output unit 112 may be a display unit that displays a display screen of a software application (for example, a display, a monitor, a touch panel, or the like composed of liquid crystal, organic EL, or the like). The input/output unit 112 may be a sound output unit that outputs audio information by sound (for example, a speaker or the like).

The control unit (controller or control circuitry) 102 is composed of a CPU and the like that subjects the overhead image-reading apparatus 100 to centralized control. The control unit (controller or control circuitry) 102 has an internal memory for storing a control program, programs describing various processing procedures and the like, and necessary data (for example, the primary storage unit 106-1) and performs information processing to execute various processes based on these programs.

The control unit 102 includes roughly the image acquiring unit 102a, the foreign object detecting unit 102b, the action detecting unit 102c, a list storing unit 102d, the detection determining unit 102e, the output image acquiring unit 102f, the image outputting unit 102g, and the holding unit 102h.

The image acquiring unit 102a causes the image-reading unit 110 to read a page-turned bound medium continuously and acquires images. The image acquiring unit 102a may store the images and the like read by the image-reading unit 110 in the storage unit 106 (the primary storage unit 106-1). Specifically, the image acquiring unit 102a may control the image-reading unit 110 to acquire continuously a plurality of images. For example, the image acquiring unit 102a may repeatedly control the controller of the image-reading unit 110 to drive the motor rotationally, composite one-dimensional images for individual lines having been photo-electrically converted by the linear sensor and analog-digital converted by the A/D converter to acquire two-dimensional images, and store the same in the storage unit 106 (the primary storage unit 106-1).

In addition, the image acquiring unit 102a may control the controller of the image-reading unit 110 to repeatedly acquire the image photo-electrically converted by the area sensor and analog-digital converted by the A/D converter and store the same in the storage unit 106 (the primary storage unit 106-1), for example. That is, the image acquiring unit 102a may have the function of performing motion photographing by the area sensor and acquiring continuous images (moving images). The image acquiring unit 102a may subject the read images by the image-reading unit 110 to projective transform (such that the images look as if the images are photographed from the front side, for example).

The foreign object detecting unit 102b detects the appearance of a foreign object in the images acquired by the image acquiring unit 102a. That is, the foreign object detecting unit 102b may detect the appearance of a hand in the images acquired by the image acquiring unit 102a.

The action detecting unit 102c detects a page-turning action on the bound medium from the images acquired by the image acquiring unit 102a, and specifies the pages corresponding to the images. That is, the action detecting unit 102c may recognize a page action from the images acquired by the image acquiring unit 102a and detect page turning. When there is a match between the moving direction of the foreign object and the preset page-turning direction in the images acquired by the image acquiring unit 102a, the action detecting unit 102c may detect a page-turning action on the bound medium and specify the pages corresponding to the images. Alternatively, when there is a match between the motion vector of the foreign object and the motion vector of the pages in the images acquired by the image acquiring unit 102a, the action detecting unit 102c may detect a page-turning action on the bound medium and specify the pages corresponding to the images.

The list storing unit 102d stores a list in the list management unit 106a. When the action detecting unit 102c detects the completion of each page-turning action, the list storing unit 102d stores the list in the list management unit 106a. That is, the list storing unit 102d may manage the list.

The detection determining unit 102e determines whether there is any image without the appearance of a foreign object out of the images corresponding to the same page. That is, the detection determining unit 102e may determine whether any image without the appearance of a foreign object is extracted from the images corresponding to the same page. The detection determining unit 102e may determine whether there is any image in which the appearance of a foreign object is not detected by the foreign object detecting unit 102b, out of the images corresponding to the same page specified by the action detecting unit 102c. The detection determining unit 102e may determine based on the list stored in the list management unit 106a whether there is any image without the appearance of a foreign object out of the images corresponding to the same page. The detection determining unit 102e may determine whether only (a plurality of) images with the appearance of a foreign object are extracted from the images corresponding to the same page.

When the detection determining unit 102e determines that there is any image without the appearance of a foreign object, the output image acquiring unit 102f acquires the image without the appearance of a foreign object as an output image. When the detection determining unit 102e determines that there is no image without the appearance of a foreign object, the output image acquiring unit 102f combines the images corresponding to the same page to acquire the output image. When the detection determining unit 102e determines that there is no image without the appearance of a foreign object, the output image acquiring unit 102f may cut out the images corresponding to the same page and composite them to acquire the output image. The output image acquiring unit 102f may acquire an image without the appearance of a foreign object as an output image based on the list stored in the list management unit 106a.

The image outputting unit 102g outputs the output image via the input/output unit 112. The image outputting unit 102g may display the output image on the input/output unit 112. The image outputting unit 102g may display the images and the like read by the image-reading unit 110 on the input/output unit 112.

The holding unit 102h stores the output image in the storage unit 106. The holding unit 102h may store the images and the like read by the image-reading unit 110 in the storage unit 106. The holding unit 102h may store the images and the like acquired by the image acquiring unit 102a in the storage unit 106.

3. Processing in the Embodiment

An example of processing at the overhead image-reading apparatus 100 configured as explained above will be explained with reference to FIGS. 5 to 15.

3-1. Basic Processing

Figure 5:
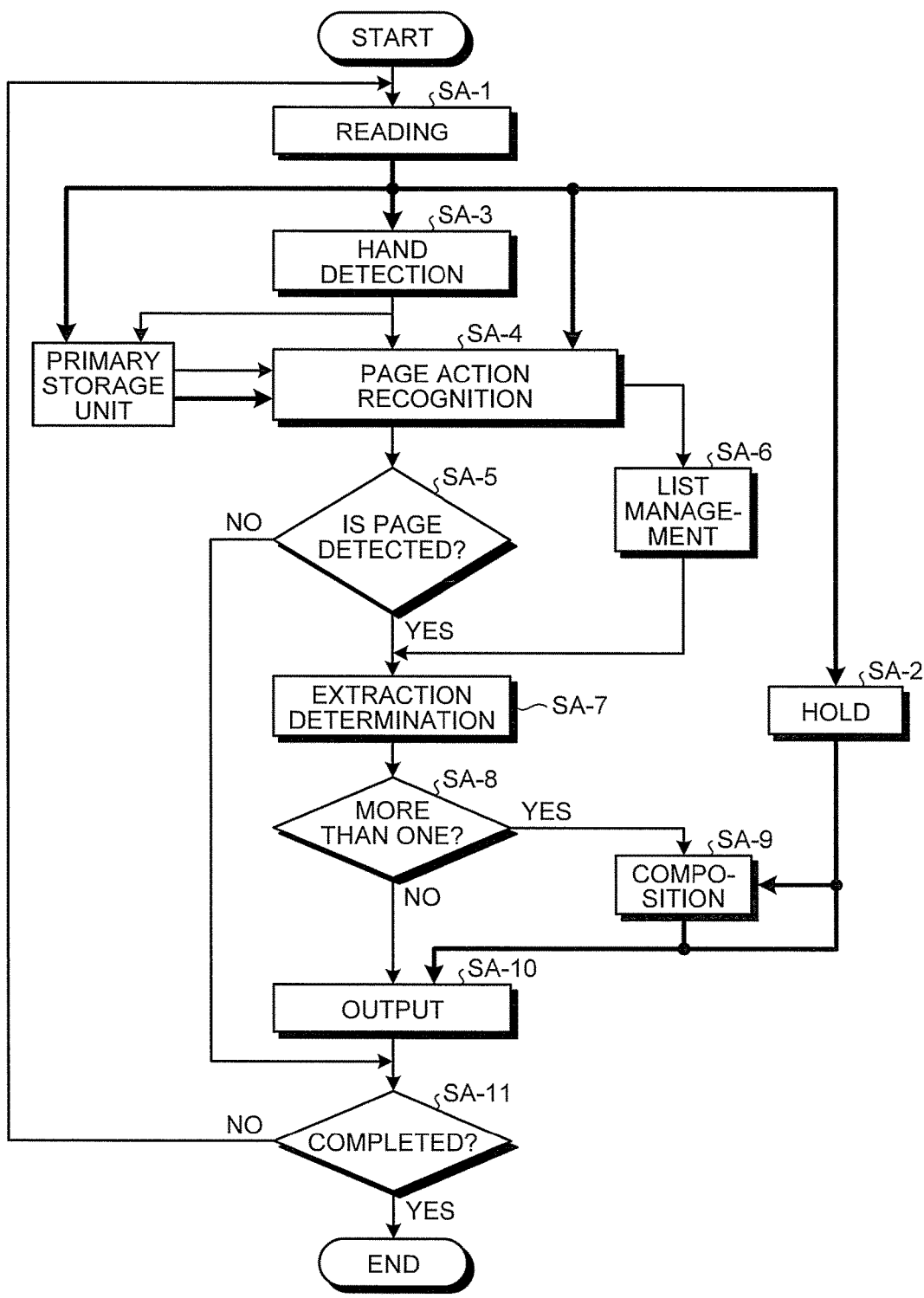
FIG. 5 is a flowchart of an example of basic processing at the overhead image-reading apparatus according to the embodiment.

An example of basic processing at the overhead image-reading apparatus 100 of the embodiment will be explained with reference to FIGS. 5 to 8. FIG. 5 is a flowchart of an example of basic processing at the overhead image-reading apparatus 100 according to the embodiment.

As shown in FIG. 5, the image acquiring unit 102a first causes the image-reading unit 110 to read continuously a bound medium turned by the user to acquire images, and stores the same in the primary storage unit 106-1 (step SA-1). In this manner, the image-reading unit 110 may perform continuous image reading through (one or more) non-contact image inputs. The image-reading unit 110 does not necessarily have to read images at regular intervals.

The holding unit 102h stores the images read by the image-reading unit 110 in the storage unit 106 (step SA-2).

The foreign object detecting unit 102b detects the appearance of the user's hand in the images acquired by the image acquiring unit 102a, and stores the results of hand appearance detection in the primary storage unit 106-1 (step SA-3). In this manner, the foreign object detecting unit 102b may detect the appearance of the hand in the input images.

The action detecting unit 102c recognizes a page action on the bound medium from the images acquired by the image acquiring unit 102a and detects a page-turning action on the bound medium (step SA-4). When there is a match between the moving direction of the user's hand and the preset page-turning direction in the images acquired by the image acquiring unit 102a based on the images stored in the primary storage unit 106-1 and the results of the hand appearance detection, the action detecting unit 102c may recognize a page action on the bound medium and detect a page-turning action on the bound medium. That is, the action detecting unit 102c may preset the turning direction to determine page turning from a hand motion. For example, the action detecting unit 102c may determine that there is page turning when there is a match between the moving direction of the hand and the turning direction as the hand has moved from one to the other sides of the bound medium divided into left and right. When the page-turning detection has failed, the action detecting unit 102c may perform a matching process later and delete the fault when determining that there is a match.

When there is a match between the motion vector of the user's hand and the motion vector of the pages in the images acquired by the image acquiring unit 102a based on the images stored in the primary storage unit 106-1 and the results of the hand appearance detection, the action detecting unit 102c may recognize a page action on the bound medium and detect a page-turning action on the bound medium. In this manner, the action detecting unit 102c may detect not only the hand motion but also other motions in conjunction with the hand motion. That is, the action detecting unit 102c may determine page turning from the hand motion and the page motion. For example, when there is a match between the motion vector of the hand and the motion vector of the pages, the action detecting unit 102c may determine that there is a turning action. The action detecting unit 102c may determine that there is a turning action when the motion vector has continuously occurred. The motion vector of the hand may be generated from the current coordinates of the hand and the previous coordinates of the hand. The action detecting unit 102c may determine page numbers for all the images stored in the storage unit 106 to determine whether there is page turning.

The action detecting unit 102c determines whether the completion of the page-turning action on the bound medium is detected (step SA-5), and specifies the pages corresponding to the images. In this manner, the action detecting unit 102c may determine whether there is page turning.

The list storing unit 102d stores a list of the numbers for the images acquired by the image acquiring unit 102a, the information on the appearance of the user's hand, and the information on the page-turning action in association with one another in the list management unit 106a (step SA-6).

When the action detecting unit 102c determines that the completion of the page-turning action on the bound medium has not been detected (step SA-5: No), the processing is shifted to step SA-11.

In contrast, when the action detecting unit 102c has detected the completion of each turning action (step SA-5: Yes), the detection determining unit 102e determines whether any image without the appearance of the user's hand is extracted from the images corresponding to the same page (step SA-7). The numbers for the images may be the orders or the like read by the image-reading unit 110. The information on the appearance of the user's hand may include information on any one, some, or all of the number of the user's hand(s), the coordinates of the user's hand, the size of the user's hand, and the shape of the user's hand. The information on page-turning action may include information on any one or both of the presence or absence of turning and the presence or the absence of page motion. The detection determining unit 102e may determine whether there is any image without the appearance of the user's hand out of the images corresponding to the same page. The detection determining unit 102e may determine whether there is any image in which the appearance of the user's hand is not been detected by the foreign object detecting unit 102b out of the images corresponding to the same page specified by the action detecting unit 102c. The detection determining unit 102e may determine based on the list stored in the list management unit 106a whether there is any image without the appearance of the user's hand out of the images corresponding to the same page.

The control unit 102 determines based on the list stored in the list management unit 106a whether the detection determining unit 102e has extracted a plurality of images optimum for the same page from the images corresponding to the same page (step SA-8).

When the control unit 102 determines that a plurality of images optimum for the same page is extracted from the images corresponding to the same page (step SA-8: Yes), the output image acquiring unit 102f cuts out the extracted images and composites them to acquire an output image (step SA-9). When the control unit 102 determines that a plurality of images optimum for the same page is extracted from the images corresponding to the same page, the output image acquiring unit 102f may combine the extracted images to acquire the output image. In this manner, the output image acquiring unit 102f may form pages by combining the images without the appearance of the hand out of the images in which pages are not turned.

When the control unit 102 determines that no plurality of images optimum for the same page is extracted from the images corresponding to the same page (step SA-8: No), the output image acquiring unit 102f acquires an extracted image (for example, the images without page motion or the appearance of the hand or the like) as an output image. The image outputting unit 102g outputs the output image acquired by the output image acquiring unit 102f via the input/output unit 112 (step SA-10). In this manner, in the embodiment, the pages acquired (formed) by the output image acquiring unit 102f may be combined to digitize the bound medium.

Figure 6:
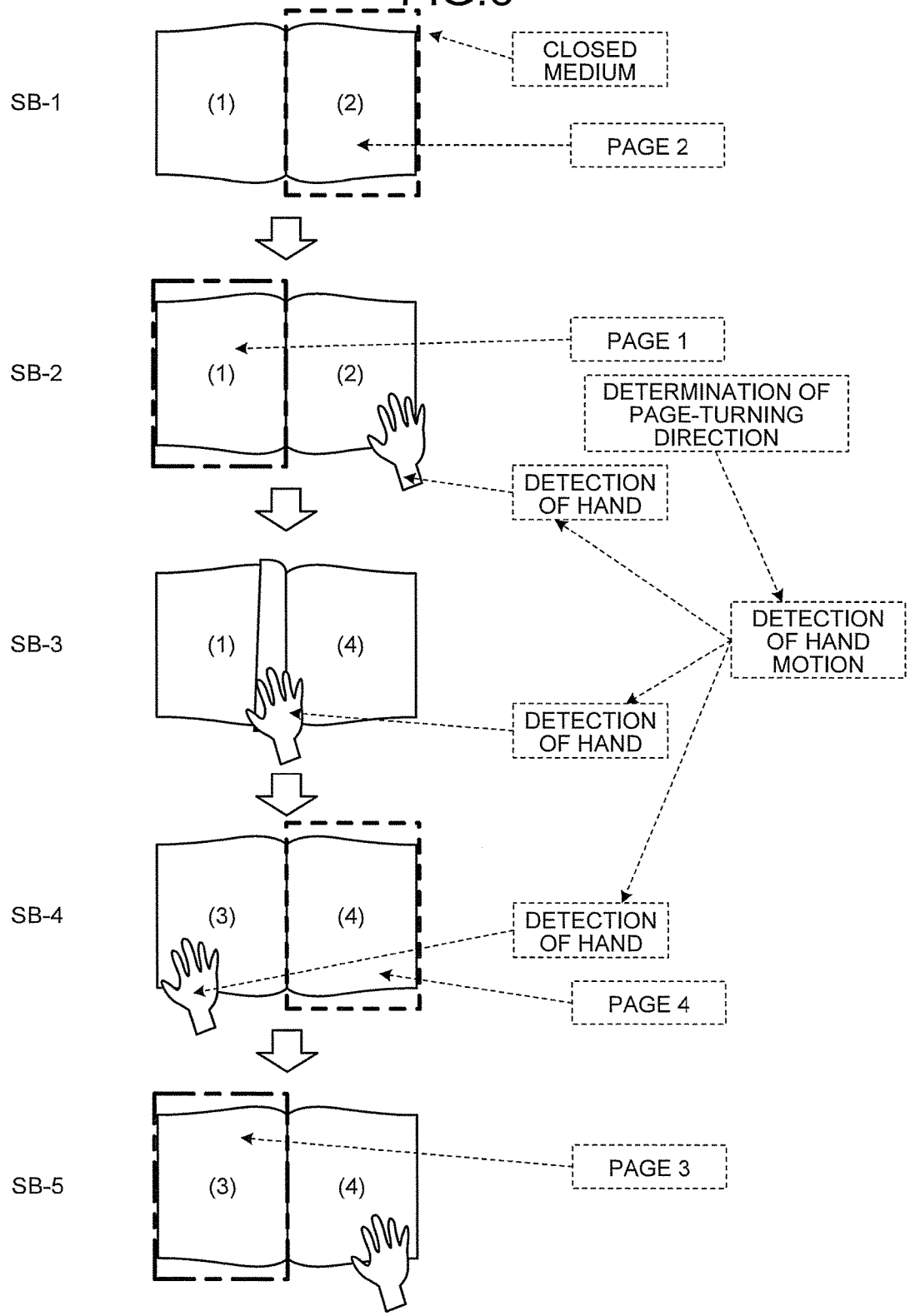
FIG. 6 is a diagram of an example of image processing according to the embodiment.

Referring to FIG. 6, descriptions will be given as to an example of image processing when the number of the hand detected as a foreign object is one in the embodiment. FIG. 6 is a diagram of an example of image processing according to the embodiment.

As shown in FIG. 6, when the bound medium is turned with one hand of the user and is continuously read by the image-reading unit 110, the output image acquiring unit 102f may acquire the images corresponding to the pages in which the appearance of the user's hand is not detected, as output images (for example, the right page (page 2) at step SB-1, the left page (page 1) at step SB-2, the right page (page 4) at step SB-4, and the left page (page 3) at step SB-5). As shown in FIG. 6, the foreign object detecting unit 102b may detect the appearance of the user's hand in the images acquired by the image acquiring unit 102a (for example, steps SB-2 to SB-5). The action detecting unit 102c may determine the page-turning direction based on the images acquired by the image acquiring unit 102a and the results of the hand appearance detection by the foreign object detecting unit 102b (for example, steps SB-2 to SB-4).

Figure 7:
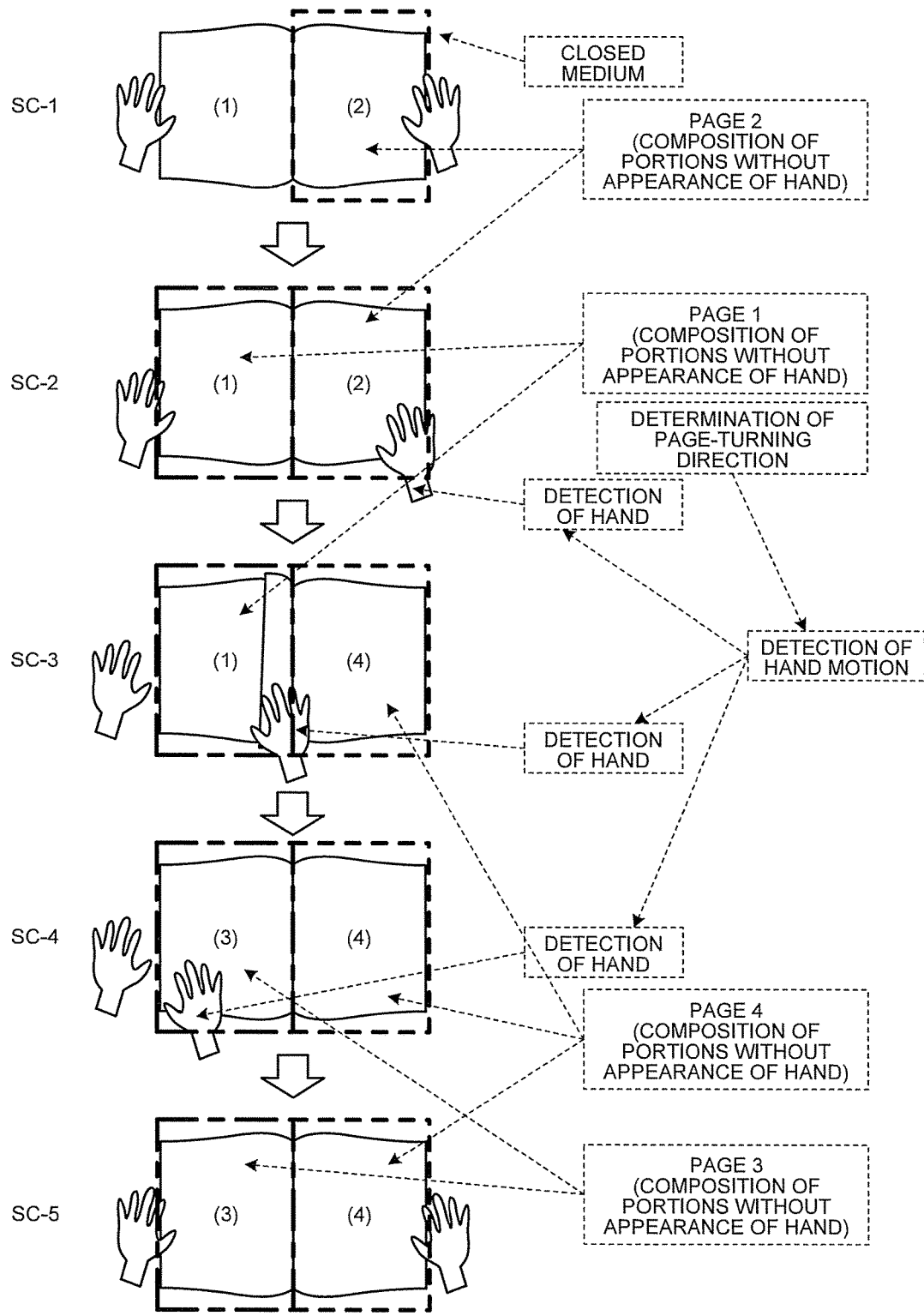
FIG. 7 is a diagram of an example of image processing according to the embodiment.
Figure 8:
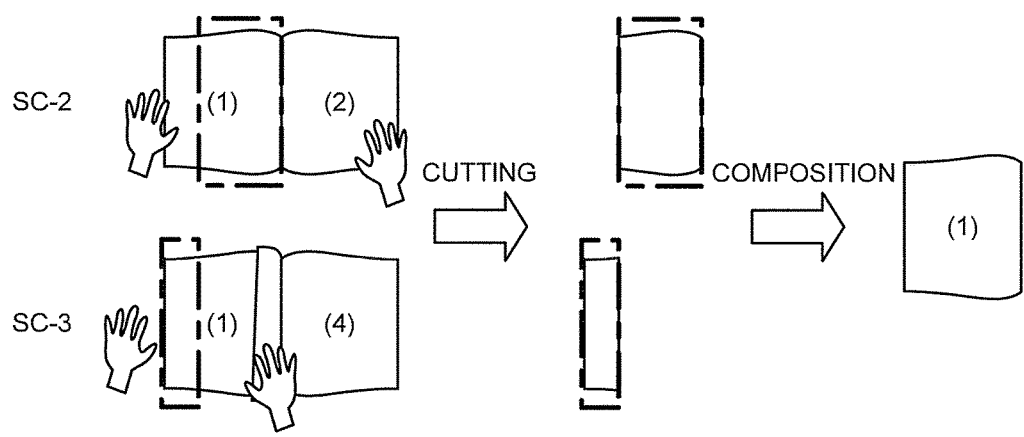
FIG. 8 is a diagram of an example of image processing according to the embodiment.

Next, with reference to FIGS. 7 and 8, descriptions will be given to an example of image processing when the number of the hands detected as foreign objects is two in the embodiment. FIGS. 7 and 8 are diagrams illustrating examples of image processing in the embodiment.

As shown in FIG. 7, when the bound medium is turned by the both hands of the user and is continuously read by the image-reading unit 110, the output image acquiring unit 102f may acquire the images corresponding to the pages in which the appearance of the user's hand is not detected, as output images (for example, the right page (page 4) at step SC-4). Meanwhile, when the detection determining unit 102e determines that there is no image without the appearance of a foreign object out of the images corresponding to the same page (for example, pages 1 to 3), the output image acquiring unit 102f may combine the images corresponding to the same page to acquire the output images.

For example, as shown in FIG. 8, to acquire the output images corresponding to page 1 of the bound medium shown in FIG. 7, the output image acquiring unit 102f may cut and separate the portions of the images corresponding to page 1 (for example, the left page at step SC-2 and the left page at step SC-3) in which the appearance of the hand is detected to the right and left sides, and composite the same to acquire the output images.

Returning to FIG. 5, the control unit 102 determines whether the image-reading unit 110 has completed the reading of the bound medium (step SA-11).

When the control unit 102 determines that the image-reading unit 110 has not completed the reading of the bound medium (step SA-11: No), the processing is shifted to step SA-1.

In contrast, when the control unit 102 determines that the image-reading unit 110 has completed the reading of the bound medium (step SA-11: Yes), the processing is ended.

In this manner, in the embodiment, it is possible to digitize the bound medium by the human's natural turning action. In addition, in the embodiment, it is possible to provide images without skip of contents by combining the portions of the images without the appearance of the hand. For example, the overhead image-reading apparatus 100 of the embodiment detects a page-turning action from the images continuously read by the area sensor, based on the motions of the hand and the book, and selects a frame optimum for reading. After that, the overhead image-reading apparatus 100 of the embodiment subjects the selected frame to image analysis, and outputs the frame unless there is the appearance of a foreign object such as a hand in the frame. When there is the appearance of a foreign object such as a hand in the frame, the overhead image-reading apparatus 100 of the embodiment searches the preceding and following images for a frame without the appearance of the foreign object seen in the selected images, composites the two frames to produce an image without the appearance of a foreign object such as a hand, and outputs the image. The overhead image-reading apparatus 100 of the embodiment can repeat this control to allow the bound medium to be digitized merely by turning the pages.

3-2. Specific Processing

Figure 9A:
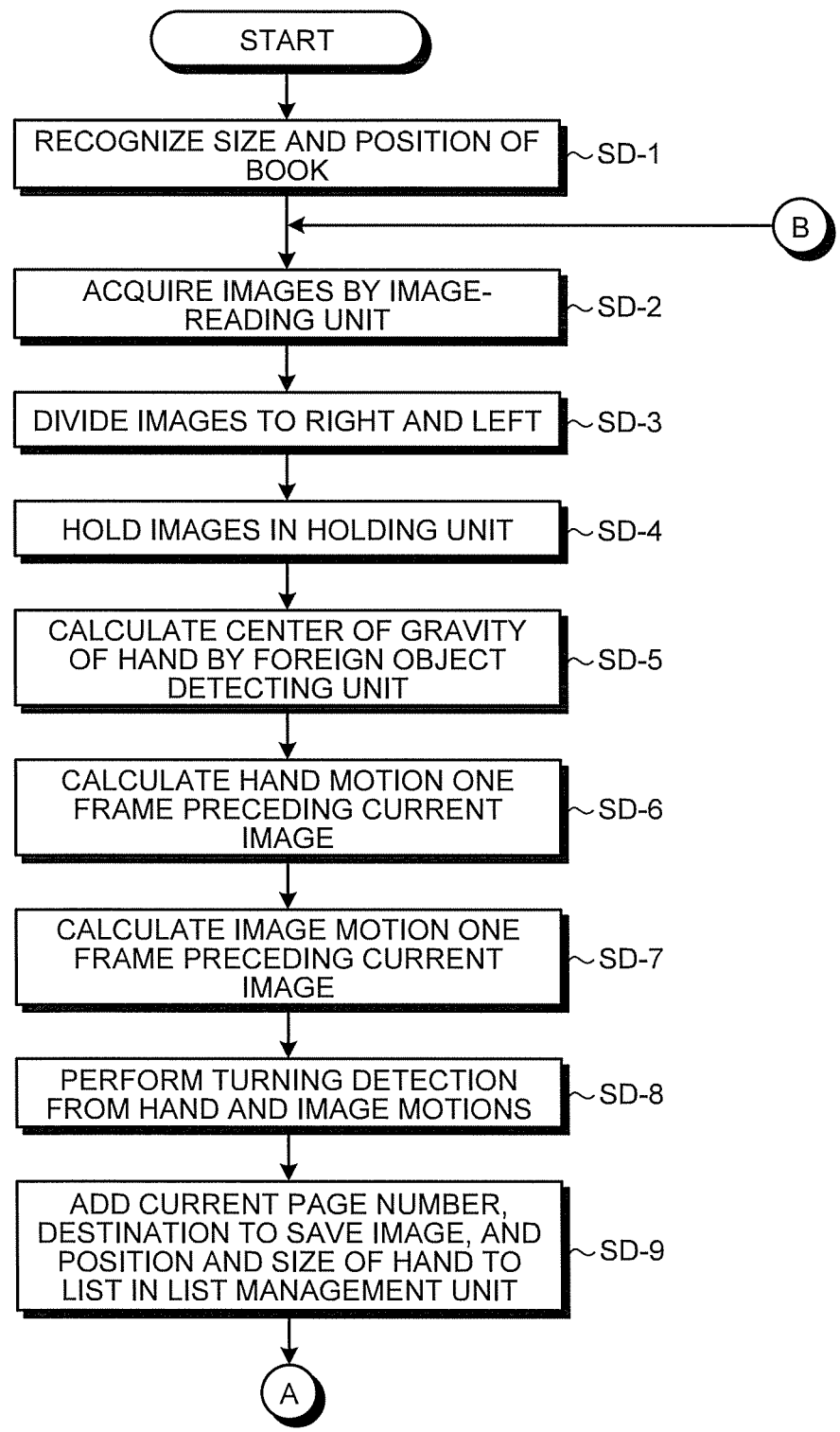
FIG. 9A is a flowchart of an example of specific processing at the overhead image-reading apparatus according to the embodiment.
Figure 9B:
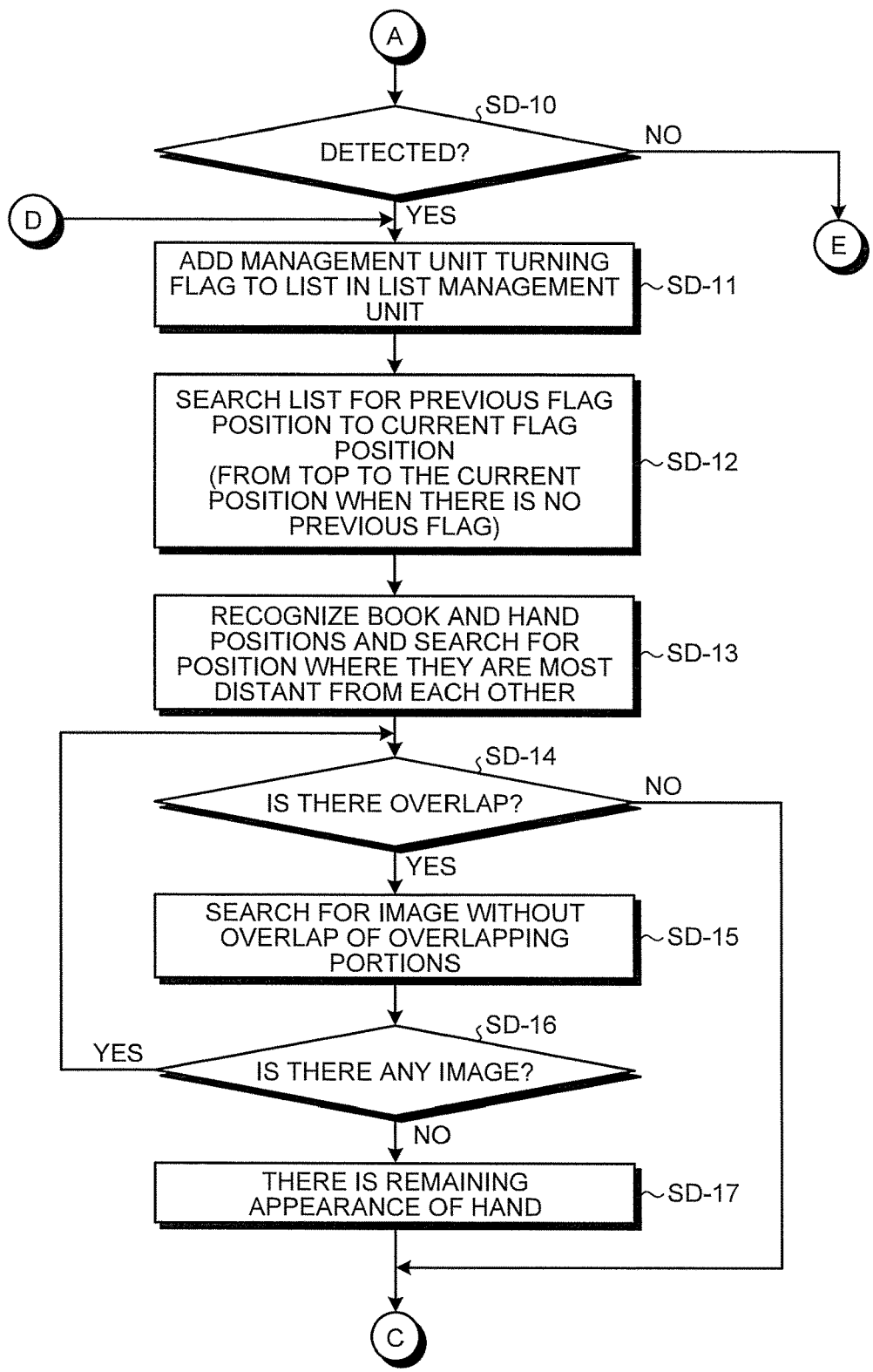
FIG. 9B is a flowchart of the example of specific processing at the overhead image-reading apparatus according to the embodiment.
Figure 9C:
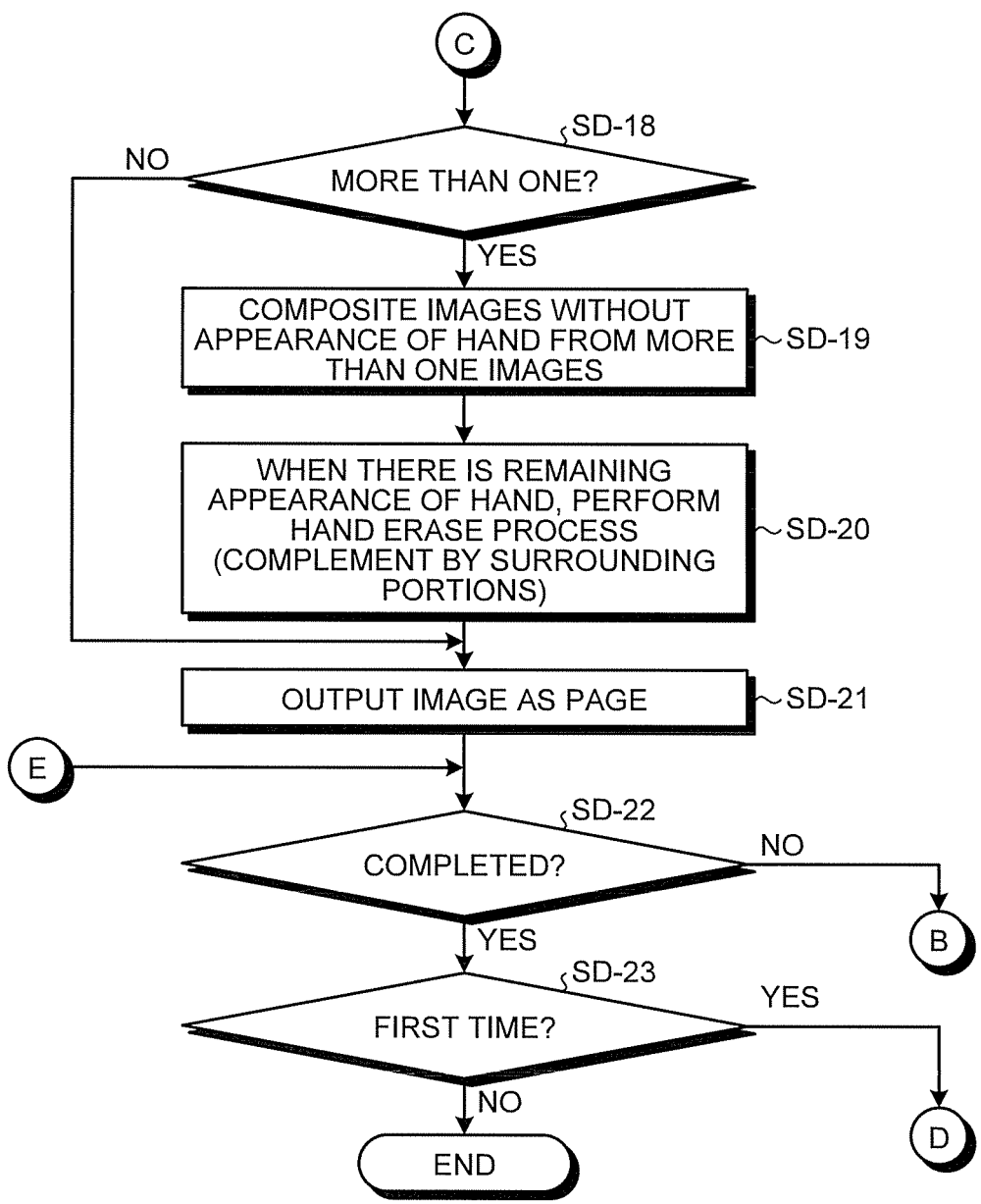
FIG. 9C is a flowchart of the example of specific processing at the overhead image-reading apparatus according to the embodiment.

Subsequently, an example of specific processing at the overhead image-reading apparatus 100 of the embodiment will be explained with reference to FIGS. 9 to 15. FIG. 9 (FIGS. 9A to 9C) is a flowchart of an example of specific processing at the overhead image-reading apparatus 100 of the embodiment.

As shown in FIG. 9, first, the control unit 102 recognizes the size and position of a book placed upward on a loading stand (step SD-1).

The image acquiring unit 102a causes the image-reading unit 110 to read continuously the book page-turned by the user to acquire images (step SD-2).

The image acquiring unit 102a acquires images formed by dividing the acquired images in a double-page spread form (divided images) (step SD-3).

The holding unit 102h stores (holds) the images (divided images) acquired by the image acquiring unit 102a in the storage unit 106 (step SD-4).

The foreign object detecting unit 102b detects the appearance of the user's hand in the images stored in the storage unit 106 and calculates the center of gravity of the hand (step SD-5).

Referring to FIG. 10, an example of a hand detection process in the embodiment will be explained. FIG. 10 (FIGS. 10A to 10E) are diagrams of an example of a hand detection process according to the embodiment.

As shown in FIG. 10 (FIG. 10B), the image acquiring unit 102a acquires an RGB image with the appearance of the hand (step SE-1).

Figure 10A:
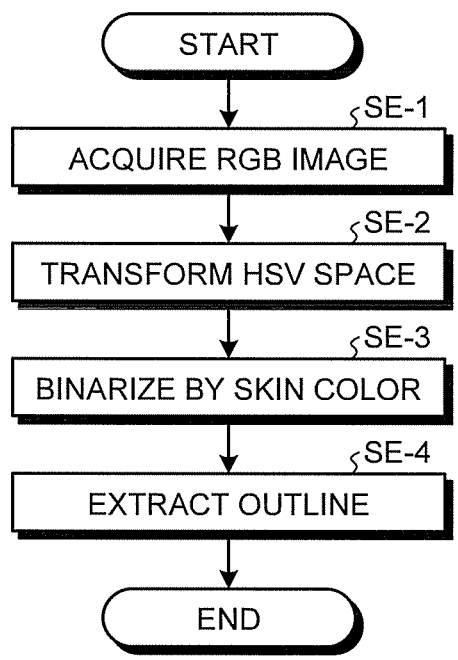
FIG. 10A is a diagram of an example of a hand detection process according to the embodiment.
Figure 10B:
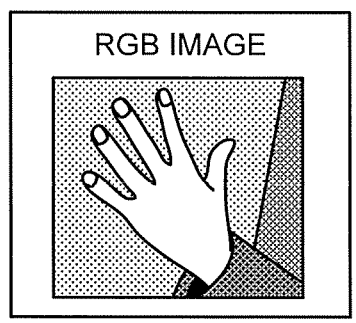
FIG. 10B is a diagram of the example of the hand detection process according to the embodiment.
Figure 10C:
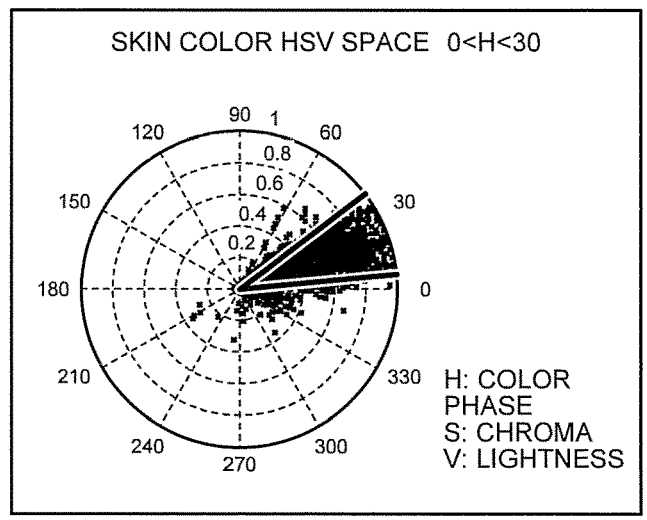
FIG. 10C is a diagram of the example of the hand detection process according to the embodiment.

As shown in FIG. 10C, the foreign object detecting unit 102b converts pixels constituting the RGB image acquired by the image acquiring unit 102a from RGB values to HSV values (projects into an HSV space) (step SE-2).

Figure 10D:
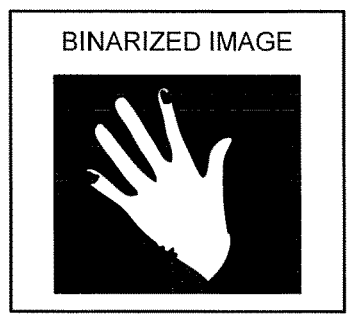
FIG. 10D is a diagram of the example of the hand detection process according to the embodiment.

As shown in FIG. 10D, the foreign object detecting unit 102b subjects the converted HSV values to binization by a skin color phase value (0<H<30) to acquire the binarized image (step SE-3). In this manner, the foreign object detecting unit 102b may perform hand detection by a color phase. The list storing unit 102d may store the binarized hand image (binarized image) together with the list in the list management unit 106a.

Figure 10E:
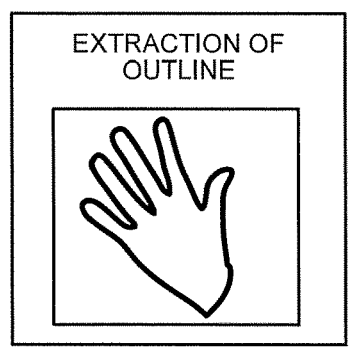
FIG. 10E is a diagram of the example of the hand detection process according to the embodiment.

As shown in FIG. 10E, the foreign object detecting unit 102b extracts the outline of the hand based on the acquired binarized image to detect the appearance of the user's hand (step SE-4), and the processing is ended.

Returning to FIG. 9, the action detecting unit 102c calculates the motion of the hand from the image (previous image) one frame preceding the image (current image) in which the appearance of the hand is detected by the foreign object detecting unit 102b at step SD-5 (step SD-6).

The action detecting unit 102c calculates the motion of the image one frame preceding the current image (step SD-7).

The action detecting unit 102c detects a page-turning action on the book by the calculated motion of the hand and the calculated motion of the image (step SD-8).

An example of a page action recognition process according to the embodiment will be explained with reference to FIG. 11. FIG. 11 (FIGS. 11A to 11E) is a diagram of an example of a page action recognition process according to the embodiment.

As shown in FIG. 11, the foreign object detecting unit 102b performs a pre-process for acquiring the images (frames) of the book continuously read by the image-reading unit 110 (step SF-1).

Figure 11A:
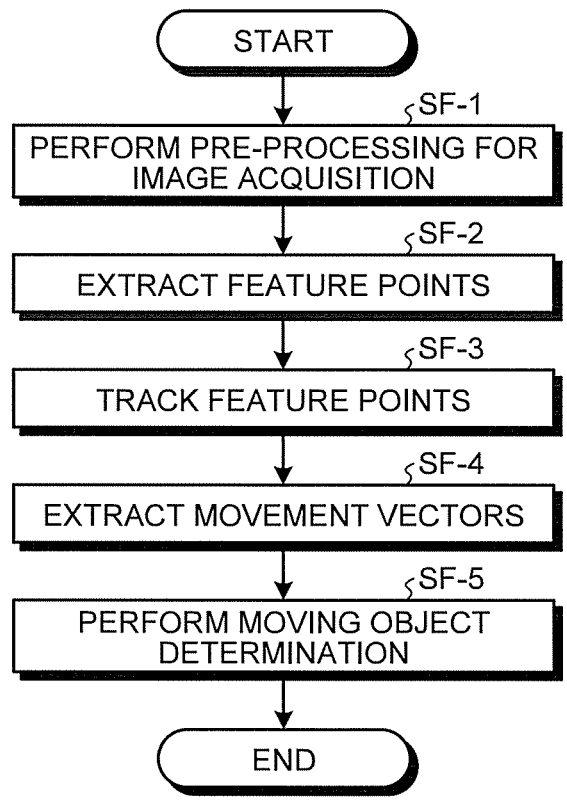
FIG. 11A is a diagram of an example of a page action recognition process according to the embodiment.
Figure 11B:
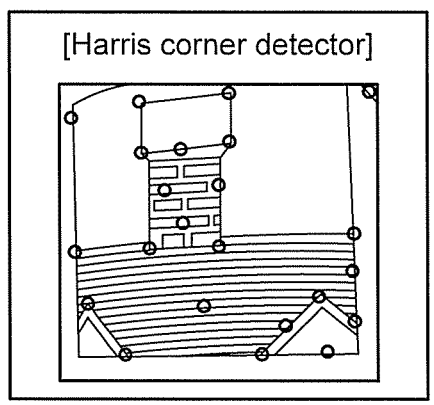
FIG. 11B is a diagram of the example of the page action recognition process according to the embodiment.

As shown in FIG. 11B, the foreign object detecting unit 102b extracts feature points from the acquired images (frames) using a Harris corner detector (step SF-2). The foreign object detecting unit 102b may calculate a structure tensor M according to the following equation 1 in which the pixels of an image I are designated as (x, y), the structure tensor as M, the feature point discriminant as R, and the slice as T:

[Equation 1]

$$M = \begin{bmatrix} \left(\frac{\partial I}{\partial x}\right)^2 & \frac{\partial I}{\partial x}\frac{\partial I}{\partial y} \\ \frac{\partial I}{\partial x}\frac{\partial I}{\partial y} & \left(\frac{\partial I}{\partial y}\right)^2 \end{bmatrix} = \begin{bmatrix} A & C \\ C & B \end{bmatrix} \quad \text{(Equation 1)}$$

The eigenvalue of M can be analyzed to determine the things explained below. Specifically, in the following equation 2, I (x, y) have no feature points. In the following equation 3, edges exist. When $\lambda_1$ and $\lambda_2$ take large positive values, corners exist.

[Equation 2]

$$\lambda_1 \approx 0 \text{ and } \lambda_2 \approx 0 \quad \text{(Equation 2)}$$

[Equation 3]

$$\lambda_1 \approx 0 \text{ and } \lambda_2 \text{ is a positive and somewhat large value} \quad \text{(Equation 3)}$$

The feature amount R indicating simply the eigenvalue may be calculated as $R = \det(M) - k(\text{tr}(M))^2$. At that time, $\det(M) = \lambda_1 \lambda_2 = AB - C^2$ and $\text{tr}(M) = A + B$ may be determined. In addition, k is preferably 0.04 to 0.15 in general. When R>T, the coordinates of R may be determined as corner.

Figure 11C:
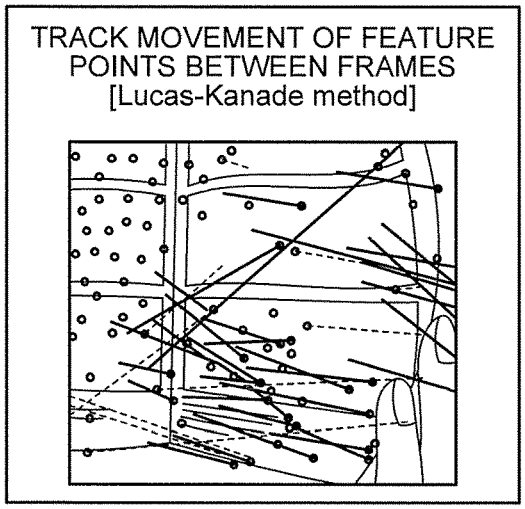
FIG. 11C is a diagram of the example of the page action recognition process according to the embodiment.

As shown in FIG. 11C, the foreign object detecting unit 102b tracks the movement of the extracted feature points between the frames by the use of Lucas-Kanade method (step SF-3).

Figure 11D:
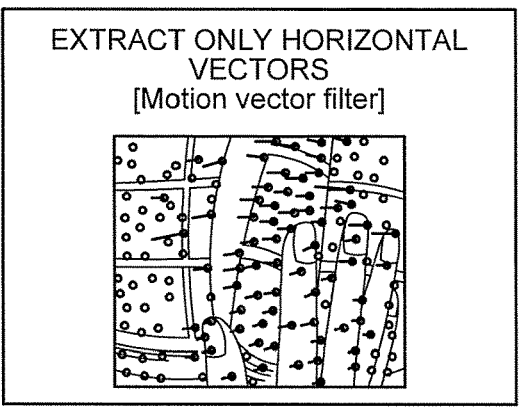
FIG. 11D is a diagram of the example of the page action recognition process according to the embodiment.

As shown in FIG. 11D, from the movement of the feature points between the frames, the foreign object detecting unit 102b extracts only horizontal motion vectors by the use of a motion vector filter (step SF-4). In this example, the pixels are designated as (x, y), the time as t, the angle of the motion vectors as θ, and the slices as $T_L$ and $T_U$ (vector scalars). The foreign object detecting unit 102b may calculate the motion of the turning action tan ω according to the following equation 4 in which the turning action is assumed to be in the horizontal direction, the current coordinates are designated as $(X_t, Y_t)$, the next time coordinates as $(X_{t+1}, Y_{t+1})$, and the movement angle formed by the two coordinates as ω.

[Equation 4]

$$\frac{y_{t+1} - y_t}{x_{t+1} - x_t} = \frac{\sin \omega}{\cos \omega} = \tan \omega \quad \text{(Equation 4)}$$

When the allowable angle in the horizontal direction is designated as θ, one of the determination conditions is the following equation 5:

[Equation 5]

$$\tan -\theta \leq \tan \omega \leq \tan \theta \quad \text{(Equation 5)}$$

When $T_L$ and $T_U$ are set as the upper and lower limits for the movement amount, one of the determination conditions is the following equation 6 based on the distance between two points:

[Equation 6]

$$T_L < \sqrt{(x_{t+1}-x_t)^2+(y_{t+1}-y_t)^2} < T_U \quad \text{(Equation 6)}$$

When the equation 5 and the equation 6 hold at the same time, the foreign object detecting unit 102b may determine the horizontal vectors and save the same.

Figure 11E:
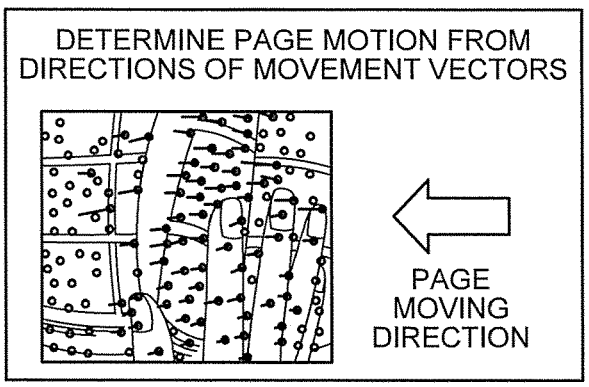
FIG. 11E is a diagram of the example of the page action recognition process according to the embodiment.

As shown in FIG. 11E, the foreign object detecting unit 102b determines the motion of the page (moving direction) from the directions of the whole extracted motion vectors (moving object determination), detects a page-turning action on the book (step SF-5), and the process is ended.

Returning to FIG. 9, the list storing unit 102d adds the current page number, the destination to save the image, and the position and size of the hand to the list in the list management unit 106a (step SD-9).

Examples of a list according to the embodiment will be explained with reference to FIGS. 12 and 13. FIGS. 12 and 13 are diagrams of examples of a list according to the embodiment.

FIG. 12 shows a specific example of a right list (image list) of images divided to right and left corresponding to the double-page spread of the book. As shown in FIG. 12, the image list may include information on the image numbers for the images, the presence or absence of page turning, the presence or absence of page motion, the number of hands appearing in the images, the coordinates of the hands appearing in the images, the sizes of the hands, and the shapes of the hands (images). For example, referring to FIG. 12, the images with image numbers 8 to 10 have neither the appearance of the hand nor page motion. In the embodiment, the output image acquiring unit 102f may acquire the image with the image number 8 on the top of the list (the oldest in a time series) as an output image. Specifically, although the appearance of the hand is detected in the image with the image number 11, the foreign object detecting unit 102b may not have performed perfectly a hand detection process on the images with the image numbers 9 and 10 due to image processing, and therefore the output image acquiring unit 102f may acquire the image with image number 8 as an output image.

FIG. 13 shows a specific example of a left list (image list) of images divided to right and left corresponding to the double-page spread of the book. For example, referring to FIG. 13, there is no image without the appearance of the hand other than the images with the image numbers 1 and 2. Accordingly, the output image acquiring unit 102f may cut the images corresponding to the same page and composite the images to acquire an output image. Specifically, the output image acquiring unit 102f may search the list for the portions (of the images) without the overlap between the appearances of the hand, and cut out the image portions and composite the same to acquire an output image. The same numbers in the right and left lists may indicate the images taken at the same time.

Returning to FIG. 9, the action detecting unit 102c determines whether the completion of the page-turning action on the bound medium is detected (step SD-10), and specifies the pages corresponding to the images When the action detecting unit 102c determines that the completion of the page-turning action on the bound medium has not been detected (step SD-10: No), the processing is shifted to step SD-22.

In contrast, when the action detecting unit 102c determines that the completion of the page-turning action on the bound medium is detected (step SD-10: Yes), the list storing unit 102d adds a management unit turning flag to the list in the list management unit 106a (step SD-11).

The detection determining unit 102e searches the list stored in the list management unit 106a (for the images) from the previous to the current positions of the management unit turning flag in the list (step SD-12). When there is no previous management unit turning flag in the list, the detection determining unit 102e may search the list stored in the list management unit 106a (for the images) from the top to the current position.

The detection determining unit 102e recognizes the position of the book and the position of the hand in the searched images and searches for the position where the book and the hand are separated most distant from each other (step SD-13).

The detection determining unit 102e determines whether the searched image has the appearance of the hand (the overlapping hand) (step SD-14).

When the detection determining unit 102e determines that the image does not have the overlapping hand (step SD-14: No), the processing is shifted to step SD-18.

In contrast, when the detection determining unit 102e determines that the images has the overlapping hand (step SD-14: Yes), the detection determining unit 102e searches for an image without the overlap of the overlapping portion (step SD-15).

The detection determining unit 102e determines whether there is any image without the overlap of the overlapping hand portions (step SD-16).

When the detection determining unit 102e determines that there is any image without the overlap of the overlapping hand portions (step SD-16: Yes), the processing is shifted to step SD-14.

In contrast, when the detection determining unit 102e determines that there is not any image without the overlap of the overlapping hand portions (step SD-16: No), the detection determining unit 102e determines that the image has the appearance of the hand (the remaining appearance of the hand) (step SD-17).

Based on the list stored in the list management unit 106a, the control unit 102 determines whether the detection determining unit 102e has extracted a plurality of images optimum for the same page from the images corresponding to the same page (step SD-18).

When the control unit 102 determines that a plurality of images optimum for the same page has not been extracted from the images corresponding to the same page (step SD-18: No), the output image acquiring unit 102f acquires the extracted image as an output image and then the processing is shifted to step SD-21.

When the control unit 102 determines that a plurality of images optimum for the same page is extracted from the images corresponding to the same page (step SD-18: Yes), the output image acquiring unit 102f composites the images without the appearance of the hand from the extracted images to acquire an output image (step SD-19).

When the image has the remaining appearance of the hand, the output image acquiring unit 102f performs a hand deletion process (complementation by the surrounding portions) and acquires an output image (step SD-20). That is, when there are regions in which the appearance of the hand is detected (partial images) in the images corresponding to the same page, the output image acquiring unit 102f may delete the appearance of the hand from the images and use the images corresponding to other pages (for example, preceding and following pages and the like) to complement the portions.

The image outputting unit 102g outputs the images acquired by the output image acquiring unit 102f (output images) as pages via the input/output unit 112 (step SD-21).

The control unit 102 determines whether the image-reading unit 110 has completely read the book (step SD-22).

When the control unit 102 determines that the image-reading unit 110 has not completely read the book (step SD-22: No), the processing is shifted to step SD-2.

In contrast, when the control unit 102 determines that the image-reading unit 110 has completely read the book (step SD-22: Yes), the control unit 102 determines whether this is the first time the processing was performed (step SD-23).

When the control unit 102 determines that this is the first time the processing was performed (step SD-23: Yes), the processing is shifted to step SD-11.

In contrast, when the control unit 102 determines that this is not the first time the processing was performed (step SD-23: No), the processing is ended.

That is, in the embodiment, images are continuously read and hand detection is performed on the images. Then, the motion of the hand is determined from the images and their to-and-fro motion, the page action is determined from the motion of the images, and page-turning is determined from the motion of the hand (and the motion of the pages in synchronization with the motion of the hand). In the embodiment, based on the results of these determinations, a frame image is extracted as a candidate. When a plurality of images is extracted, the portions of the images without the appearance of the hand are composited to one page. In the embodiment, these processes are repeated to produce continuous images.

Figure 14:
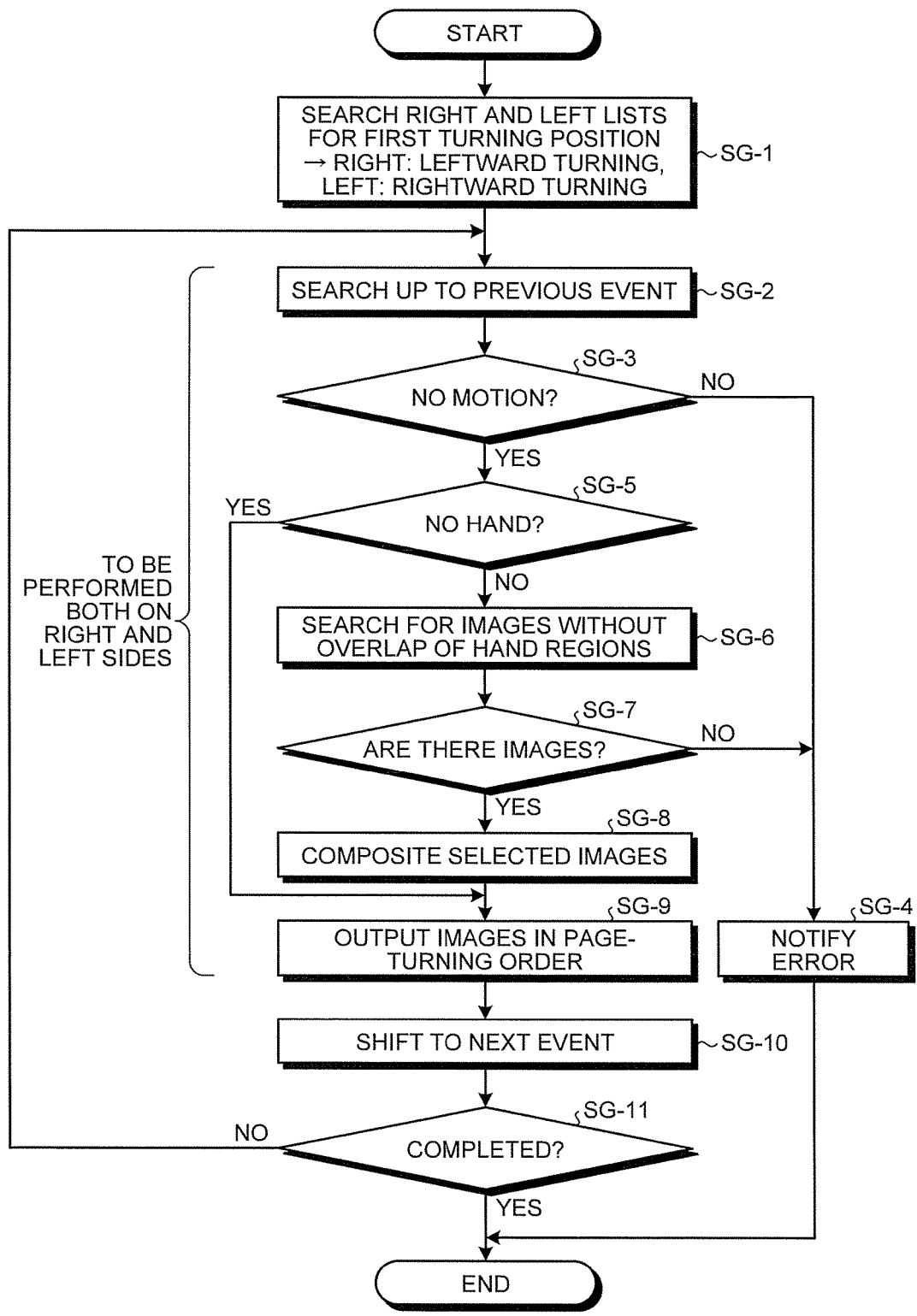
FIG. 14 is a flowchart of an example of an extracted frame determination process according to the embodiment.

An example of an extracted frame determination process of the embodiment will be explained with reference to FIG. 14. FIG. 14 is a flowchart of an example of an extracted frame determination process according to the embodiment.

Referring to FIG. 14, the detection determining unit 102e searches the right and left lists stored in the list management unit 106a for the first turning position (step SG-1). Specifically, for leftward turning, the first turning position is on the right list, and for right turning, the first turning position is on the left list.

The detection determining unit 102e searches the list stored in the list management unit 106a up to the previous event (start, end, or page-turning start) (step SG-2).

The detection determining unit 102e determines based on the list stored in the list management unit 106a whether there is any image without page motion out of the images corresponding to the same page (step SG-3).

When the detection determining unit 102e determines that there is not any image without page motion out of the images corresponding to the same page (step SG-3: No), the image outputting unit 102g outputs an error notification via the input/output unit 112 (step SG-4), and the processing is ended.

When the detection determining unit 102e determines that there is any image without page motion out of the images corresponding to the same page (step SG-3: Yes), the detection determining unit 102e then determines whether there is any image without the appearance of the user's hand based on the list stored in the list management unit 106a (step SG-5).

When the detection determining unit 102e determines that there is any image without the appearance of the user's hand (step SG-5: Yes), the output image acquiring unit 102f acquires the image without the appearance of the hand as an output image, and the processing is shifted to step SG-9. The output image acquiring unit 102f selects (one or more) optimum frame image along the time axis up to the previous page-turning. When there is a plurality of candidates, the output image acquiring unit 102f may select the one with less page motion. That is, the output image acquiring unit 102f may acquire as an output image the image with the larger image number or the image on both sides of which the images have less page motion.

In contrast, when the detection determining unit 102e determines that there is not any image without the appearance of the user's hand (step SG-5: No), the control unit 102 searches the list stored in the list management unit 106a for any image without the overlap of the hand regions (step SG-6).

Figure 15:
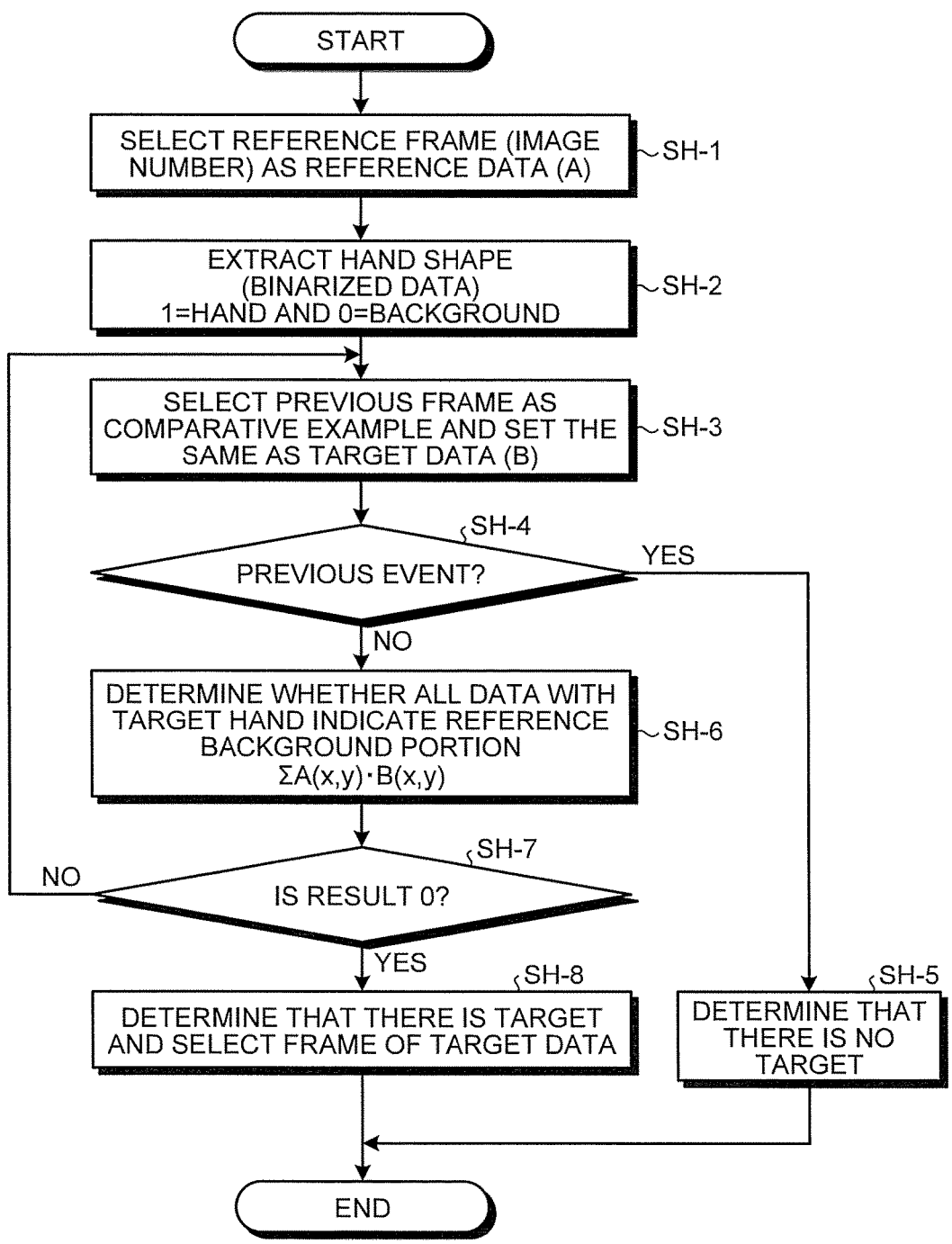
FIG. 15 is a flowchart of an example of a process for searching for an image without an overlap of hand regions according to the embodiment.

An example of search for an image without the overlap of hand regions according to the embodiment will be explained with reference to FIG. 15. FIG. 15 is a flowchart of an example of a process for searching for an image without the overlap of hand regions according to the embodiment.

As shown in FIG. 15, the control unit 102 selects a reference frame (image number) as reference data (A) based on the list stored in the list management unit 106a (step SH-1).

The control unit 102 extracts information on the shape of the hand from the reference data (A), and adds binarized data (1=hand and 0=background) to pixels A(x, y) of the reference data (A) (step SH-2).

The control unit 102 selects the previous frame as the comparative target, and sets the same as target data (B) (step SH-3).

The control unit 102 determines whether the target data (B) indicates the previous event (for example, a different page or the like) of the reference data (A) (step SH-4).

When the control unit 102 determines that the target data (B) indicates the previous event of the reference data (A) (step SH-4: Yes), the control unit 102 concludes that there is no comparative target (step SH-5), and the processing is ended.

In contrast, when the control unit 102 determines that the target data (B) does not indicates the previous event of the reference data (A) (step SH-4: No), the control unit 102 extracts information on the shape of the hand from the target data (B), adds binarized data (1=hand and 0=background) to pixels B(x, y) of the target data (B), and calculates the product of the pixels of both the data (for example, the pixels in the same coordinates and the like) ($\Sigma A(x, y)B(x, y)$) to detect whether all the data with the appearance of the hand out of the target data constitute the background portions of the reference data (step SH-6).

The control unit 102 determines whether the calculation result, that is, the product ($\Sigma A(x, y)B(x, y)$) =0 (step SH-7).

When the control unit 102 determines that the calculated result≠0 (step SH-7: No), the processing is shifted to step SH-3.

When the control unit 102 determines that the calculation result=0 (step SH-7: Yes), the control unit 102 concludes that there is a target, selects the frames of the target data (B) as the images without the overlap of the hand regions (step SH-8), and the processing is ended.

Returning to FIG. 14, the control unit 102 determines whether there is any image without the overlap of the hand regions (step SG-7).

When the control unit 102 determines that there is not any image without the overlap of the hand regions (step SG-7: No), the processing is shifted to step SG-4.

When the control unit 102 determines that there are images without the overlap of the hand regions (step SG-7: Yes), the output image acquiring unit 102f cuts out the selected images without the overlap of the hand regions and composites the same to acquire output images (step SG-8).

The image outputting unit 102g outputs the output images acquired by the output image acquiring unit 102f via the input/output unit 112 in the page-turning order (step SG-9). The steps SG-2 to SG-9 may be performed on both the right and left sides.

The control unit 102 shifts to the processing on the next event based on the list stored in the list management unit 106a (step SG-10).

The control unit 102 determines whether the event is completed based on the list stored in the list management unit 106a (step SG-11).

When the control unit 102 determines that the event is not completed (step SG-11: No), the processing is shifted to step SG-2.

In contrast, when the control unit 102 determines that the event is terminated (step SG-11: Yes), the processing is ended.

4. Other Embodiments

The embodiment of the present disclosure is explained above. However, the present disclosure may be implemented in various different embodiments other than the embodiment described above within a technical scope described in claims.

For example, an example in which the overhead image-reading apparatus 100 performs the processing as a stand-alone apparatus is explained. However, the overhead image-reading apparatus 100 can be configured to perform processes in response to request from a client terminal (having a housing separate from the overhead image-reading apparatus 100) and return the process results to the client terminal.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the overhead image-reading apparatus 100 are merely conceptual and may not necessarily physically resemble the structures shown in the drawings.

For example, the process functions performed by each device of the overhead image-reading apparatus 100, especially the each process function performed by the control unit 102, can be entirely or partially realized by CPU and a computer program executed by the CPU or by a hardware using wired logic. The computer program, recorded on a non-transitory computer readable recording medium including programmed commands for causing a computer to execute the method of the present disclosure, can be mechanically read by the overhead image-reading apparatus 100 as the situation demands. In other words, the storage unit 106 such as read-only memory (ROM) or hard disk drive (HDD) stores the computer program that can work in coordination with an operating system (OS) to issue commands to the CPU and cause the CPU to perform various processes. The computer program is first loaded to the random access memory (RAM), and forms the control unit in collaboration with the CPU.

Alternatively, the computer program can be stored in any application program server connected to the overhead image-reading apparatus 100 via any network, and can be fully or partially downloaded as the situation demands.

The computer program may be stored in a computer-readable recording medium, or may be structured as a program product. Here, the "recording medium" includes any "portable physical medium" such as a memory card, a USB (Universal Serial Bus) memory, an SD (Secure Digital) card, a flexible disk, an optical disk, a ROM, an EPROM (Erasable Programmable Read Only Memory), an EEPROM (Electronically Erasable and Programmable Read Only Memory), a CD-ROM (Compact Disk Read Only Memory), an MO (Magneto-Optical disk), a DVD (Digital Versatile Disk), and a Blu-ray (registered trademark) Disc.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

Various databases (the list management unit 106a) stored in the storage unit 106 is a storage unit such as a memory device such as a RAM or a ROM, a fixed disk device such as a HDD, a flexible disk, and an optical disk, and may store therein various programs, tables, databases, and web page files used for providing various processing or web sites.

The overhead image-reading apparatus 100 may be structured as an information processing apparatus such as known personal computers or workstations, or may be structured by connecting any peripheral devices to the information processing apparatus. Furthermore, the overhead image-reading apparatus 100 may be realized by mounting software (including programs, data, or the like) for causing the information processing apparatus to implement the method according of the invention.

The distribution and integration of the device are not limited to those illustrated in the figures. The device as a whole or in parts can be functionally or physically distributed or integrated in an arbitrary unit according to various attachments or how the device is to be used. That is, any embodiments described above can be combined when implemented, or the embodiments can selectively be implemented.

The present disclosure makes it possible to, when a bound medium is continuously read, determine which of frames in read images is effective and digitize the bound medium only by turning the pages.

According to the present disclosure, the bound medium can be digitized by a human's page-turning action with high productivity.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An overhead image-reading apparatus comprising:
an image acquiring unit configured to cause an image-reading unit to read continuously a page-turned bound medium to acquire images;
a detection determining unit configured to determine whether there is an image without an appearance of a foreign object out of the images of the same page; and
an output image acquiring unit configured to:
when the detection determining unit determines that there is an image that does not contain an appearance of a foreign object, acquires the image that does not contain an appearance of a foreign object as an output image, and
when the detection determining unit determines that all images contain an appearance of a foreign object, combines portions of two or more images of the same page to acquire the output image, the portions of the two or more images being portions of the same page that is not turned and that do not contain an appearance of a foreign object.

2. The overhead image-reading apparatus according to claim 1, further comprising:
a foreign object detecting unit that detects the appearance of the foreign object in the images acquired by the image acquiring unit; and
an action detecting unit that detects an action of turning the pages of the bound medium from the images acquired by the image acquiring unit, and specifies the pages corresponding to the images, wherein
the detection determining unit determines whether there is any image in which the appearance of the foreign object is not detected by the foreign object detecting unit, out of the images corresponding to the same page specified by the action detecting unit.

3. The overhead image-reading apparatus according to claim 2, further comprising:
a list storage unit that stores a list of numbers for the images, information on the appearance of the foreign object, and
information on the turning action of the pages in association with one another, wherein
the detection determining unit determines whether there is any image without the appearance of the foreign object out of the images corresponding to the same page, based on the list stored in the list storage unit.

4. The overhead image-reading apparatus according to claim 3, wherein,
the list storage unit stores the list when the action detecting unit detects the completion of the turning action.

5. The overhead image-reading apparatus according to claim 2, wherein,
when there is a match between the moving direction of the foreign object and the preset turning direction of the pages in the images acquired by the image acquiring unit, the action detecting unit detects the turning action of the pages of the bound medium and specifies the pages corresponding to the images.

6. The overhead image-reading apparatus according to claim 2, wherein,
when there is a match between a motion vector of the foreign object and a motion vector of the pages in the images acquired by the image acquiring unit, the action detecting unit detects the turning action of the pages of the bound medium and specifies the pages corresponding to the images.

7. The overhead image-reading apparatus according to claim 1, wherein,
when the detection determining unit determines that there is not any image without the appearance of the foreign object, the output image acquiring unit cuts out the images corresponding to the same page and composites the cut images to acquire the output image.

8. The overhead image-reading apparatus according to claim 1, wherein,
the foreign object is the user's hand.

9. An image-processing method executed by an overhead image-reading apparatus, the image-processing method comprising:
reading continuously a page-turned bound medium to acquire images;
determining whether there is an image without an appearance of a foreign object out of the images of the same page; and
when it is determined that all images contain an appearance of a foreign object, combining portions of two or more images of the same page to acquire the output image, the portions of the two or more images being portions of the same page that is not turned and that do not contain an appearance of a foreign object.

10. The image-processing method according to claim 9, further comprising:
detecting the appearance of the foreign object in the images;
detecting an action of turning the pages of the bound medium from the images; and
specifying the pages corresponding to the images, wherein
the determining includes determining whether there is any image in which the appearance of the foreign object is not detected, out of the images corresponding to the specified pages.

11. The image-processing method according to claim 10, wherein,
the determining includes determining whether there is any image without the appearance of the foreign object out of the images corresponding to the same page, based on a list of numbers for the images, information on the appearance of the foreign object, and information on the turning action of the pages in association with one another.

12. The image-processing method according to claim 11, further comprising:
the list when the completion of the turning action is detected.

13. The image-processing method according to claim 10, wherein,
the detecting the action of turning the pages includes detecting the turning action of the pages of the bound medium to specify the pages corresponding to the images when there is a match between the moving direction of the foreign object and the preset turning direction of the pages in the images.

14. The image-processing method according to claim 10, wherein,
the detecting the action of turning the pages includes detecting the turning action of the pages of the bound medium to specify the pages corresponding to the images when there is a match between a motion vector of the foreign object and a motion vector of the pages in the images.

15. The image-processing method according to claim 9, wherein, the combining includes cutting out the images corresponding to the same page and compositing the cut images to acquire the output image when it is determined that there is not any image without the appearance of the foreign object.

16. The image-processing method according to claim 9, wherein, the foreign object is the user's hand.

17. A computer program product having a non-transitory tangible computer readable medium including programmed instructions for causing, when executed by an overhead image-reading apparatus, the overhead image-reading apparatus to perform an image-processing method comprising:

reading continuously a page-turned bound medium to acquire images;

determining whether there is an image without an appearance of a foreign object out of the images of the same page; and when it is determined that all images contain an appearance of a foreign object, combining portions of two or more images of the same page to acquire the output image, the portions of the two or more images being portions of the same page that is not turned and that do not contain an appearance of a foreign object.

\* \* \* \* \*